(12) United States Patent
Topiwala et al.

(10) Patent No.: US 10,880,551 B2
(45) Date of Patent: Dec. 29, 2020

(54) METHOD AND APPARATUS FOR APPLYING DEEP LEARNING TECHNIQUES IN VIDEO CODING, RESTORATION AND VIDEO QUALITY ANALYSIS (VQA)

(71) Applicant: FastVDO LLC, Melbourne, FL (US)

(72) Inventors: Pankaj N. Topiwala, Cocoa Beach, FL (US); Madhu Peringassery Krishnan, Columbia, MD (US); Wei Dai, Clarksville, MD (US)

(73) Assignee: FastVDO LLC, Melbourne, FL (US)

( * ) Notice: Subject to any disclaimer, the term of this patent is extended or adjusted under 35 U.S.C. 154(b) by 0 days.

(21) Appl. No.: 16/508,198

(22) Filed: Jul. 10, 2019

(65) Prior Publication Data

US 2020/0021865 A1    Jan. 16, 2020

Related U.S. Application Data

(60) Provisional application No. 62/764,801, filed on Aug. 16, 2018, provisional application No. 62/696,285, filed on Jul. 10, 2018.

(51) Int. Cl.
*H04N 19/154* (2014.01)
*H04N 19/172* (2014.01)
(Continued)

(52) U.S. Cl.
CPC .......... *H04N 19/154* (2014.11); *G06N 3/08* (2013.01); *G06N 20/10* (2019.01); *G06T 3/4046* (2013.01);
(Continued)

(58) Field of Classification Search
None
See application file for complete search history.

(56) References Cited

U.S. PATENT DOCUMENTS 5,598,354 A * 1/1997 Fang ................... G06N 3/0454
708/203
9,524,028 B2    12/2016 Dai et al.
(Continued)

OTHER PUBLICATIONS

Ahalt, A. et al., "Vector Quantization with Artificial Neural Networks," Proc. Int'! Workshop on Adaptive Methods and Emergent Techniques for Sig. Proc. and Comm, Jun. 1993, pp. 42-61.
(Continued)

*Primary Examiner* — Fernando Alcon
(74) *Attorney, Agent, or Firm* — Fenwick & West LLP

(57) ABSTRACT

Video quality analysis may be used in many multimedia transmission and communication applications, such as encoder optimization, stream selection, and/or video reconstruction. An objective VQA metric that accurately reflects the quality of processed video relative to a source unprocessed video may take into account both spatial measures and temporal, motion-based measures when evaluating the processed video. Temporal measures may include differential motion metrics indicating a difference between a frame difference of a plurality of frames of the processed video relative to that of a corresponding plurality of frames of the source video. In addition, neural networks and deep learning techniques can be used to develop additional improved VQA metrics that take into account both spatial and temporal aspects of the processed and unprocessed videos.

19 Claims, 10 Drawing Sheets

(51) Int. Cl.

| | |
|---|---|
| *H04N 19/174* | (2014.01) |
| *H04N 19/567* | (2014.01) |
| *H04N 19/107* | (2014.01) |
| *G06N 3/08* | (2006.01) |
| *H04N 19/124* | (2014.01) |
| *H04N 19/176* | (2014.01) |
| *G06T 7/254* | (2017.01) |
| *G06N 20/10* | (2019.01) |
| *G06T 3/40* | (2006.01) |
| *G06T 5/00* | (2006.01) |
| *G06T 7/00* | (2017.01) |
| *G06T 9/00* | (2006.01) |
| *H04N 21/234* | (2011.01) |
| *H04N 21/2343* | (2011.01) |
| *H04N 21/236* | (2011.01) |

(52) U.S. Cl.
CPC ............ *G06T 5/001* (2013.01); *G06T 7/0002* (2013.01); *G06T 7/254* (2017.01); *G06T 9/002* (2013.01); *H04N 19/107* (2014.11); *H04N 19/124* (2014.11); *H04N 19/172* (2014.11); *H04N 19/174* (2014.11); *H04N 19/176* (2014.11); *H04N 19/567* (2014.11); *H04N 21/236* (2013.01); *H04N 21/2343* (2013.01); *H04N 21/23418* (2013.01); *G06T 2207/20081* (2013.01); *G06T 2207/20084* (2013.01); *G06T 2207/20224* (2013.01)

(56) References Cited

U.S. PATENT DOCUMENTS

| | | | |
|---|---|---|---|
| 9,829,984 | B2 | 11/2017 | Dai et al. |
| 10,225,607 | B1* | 3/2019 | Bai ............... H04N 21/251 |
| 2002/0071654 | A1* | 6/2002 | Notoya ............ H04N 21/4302 386/331 |
| 2012/0269425 | A1* | 10/2012 | Marchesotti ......... G06N 20/00 382/159 |
| 2014/0028793 | A1* | 1/2014 | Wiegand ............ H04N 19/105 348/42 |
| 2016/0335754 | A1 | 11/2016 | Aaron et al. |
| 2018/0068195 | A1 | 3/2018 | Kolarov et al. |
| 2018/0144214 | A1* | 5/2018 | Hsieh .................. G06N 3/08 |
| 2018/0176578 | A1* | 6/2018 | Rippel ................. H04N 19/44 |
| 2018/0199066 | A1* | 7/2018 | Ross ..................... G06N 3/08 |
| 2018/0332301 | A1* | 11/2018 | Tian ................... H04N 19/54 |
| 2019/0075301 | A1* | 3/2019 | Chou .................. G06N 3/08 |
| 2019/0132591 | A1* | 5/2019 | Zhang ................ H04N 19/59 |
| 2019/0180149 | A1* | 6/2019 | Knittel .............. G06K 9/00335 |
| 2019/0246111 | A1* | 8/2019 | Li ...................... G06K 9/6269 |

OTHER PUBLICATIONS

Bampis, C.G. et al., "SpatioTemporal Feature Integration and Model Fusion for Full Reference Video Quality Assessment," arXiv: 1804.04813v1, 2018, pp. 1-12.

Bengio, Y., "Chapter 5: Learning Deep Architectures: A Difficult Optimization Problem," Learning Deep Architectures for AI, University of Montreal, 2009, pp. 16-20.

Bross, B. et al., "Versatile Video Coding (Draft 6)", Joint Video Experts Team of ITU-T SG 16 WP3 and ISO/IEC JTC 1/SC 29/WG 11 JVETO2001-vE, Jul. 3-12, 2019, 455 pages.

Dai, Y. et al., "A Convolutional Neural Network Approach for Post-Processing in HEVC Intra Coding," arXiv, Oct. 29, 2016, pp. 1-12.

Daubechies, I., "Orthonormal Bases of Compact Supported Wavelets," Communications on Pure and Applied Mathematics, Oct. 1988, vol. XLA, pp. 909-996.

Dong, C. et al., "Compression Artifacts Reduction by a Deep Convolutional Network," Proceedings of the IEEE International Conference on Computer Vision, 2015, pp. 1-9.

Github—Netflix, "VMAF—Video Multi-Method Assessment Fusion," Jan. 30, 2016, 3 pages [Online] [Retrieved Sep. 10, 2019] Retrieved from the internet <URL: https://github.com/Netflix/vmaf>.

Goodfellow, I. et al., "Deep Learning," MIT Press, Chapter 6, 2016, pp. 164-223.

Groden, C., "See how much bandwidth Netflix consumes in one chart," Fortune, Oct. 8, 2015, 1 page [Online] [Retrieved Sep. 10, 2019] Retrieved from the internet <URL: https://fortune.com/2015/10/08/netflix-bandwith/>.

Handley, L., "Digital TV and video industry to exceed $100 billion, study says," CNBC, Jan. 30, 2018, 3 pages [Online] [Retrieved Sep. 10, 2019] Retrieved from the internet <URL: https://www.cnbc.com/2018/01/30/digital-tv-and-video-industry-to-exceed-100-billion-study-says.html>.

He, K. et al., "Deep Residual Learning for Image Recognition," arXiv, Dec. 10, 2015, pp. 1-12.

Institute for Telecommunication Sciences, "VQM Frequently Asked Questions (FAQ)," Date Unknown, 5 pages [Online] [Retrieved Sep. 10, 2019] Retrieved from the internet <URL: https://www.its.bldrdoc.gov/resources/video-quality-research/vqm-faq.aspx>.

International Telecommunication Union, "Series H: Audiovisual and Multimedia Systems, Infrastructure of audiovisual services—Coding of moving video: High efficiency video coding," ITU-T H-Series Recommendations, Feb. 2018, pp. 1-672.

ISO/IEC JTC 1/SC 29/WG 11 N 17050, TR 23008-15. "Information technology High efficiency coding and media delivery in heterogeneous environments Part 15: Signalling, backward compatibility and display adaptation for HDR/WCG video," Jul. 21, 2017, 52 pages.

Lant, K., "Google's Machine Learning Software Has Learned to Replicate Itself," Science Alert, Oct. 17, 2017, 3 pages [Online] [Retrieved Sep. 10, 2019] Retrieved from the internet <URL: https://www.sciencealert.com/google-s-machine-learning-software-has-learned-to-replicate-itself>.

Lecun, Y. et al., "Deep Learning," Nature, May 28, 2015, vol. 521, pp. 436-445.

Li, S. et al., "Image quality assessment by separately evaluating detail losses and additive impairments," IEEE Transactions on Multimedia, Oct. 2011, vol. 13, No. 5, pp. 935-949.

Li, Z. et al., "Toward a Practical Perceptual Video Quality Metric," The Netflix Tech Blog, Jun. 6, 2016, 21 pages [Online] [Retrieved Sep. 10, 2019] Retrieved from the internet <URL: https://medium.com/netflix-techblog/toward-a-practical-perceptual-video-quality-metric-653f208b9652>.

Mallat, S., "A Theory for Multiresolution Signal Decomposition: The Wavelet Representation," IEEE Transactions on Pattern Analysis and Machine Intelligence, Jul. 1989, vol. 11, No. 7, pp. 674-693.

Marr, D. et al., "Theory of edge detection," Proc. R. Soc. Lond., 1980, vol. 207, pp. 187-217.

Pinson, M.H et al., "Temporal video quality model accounting for variable frame delay distortions," IEEE Transactions on Broadcasting, Dec. 2014, vol. 60, No. 4, pp. 637-649.

Raj, S. et al, "Comparison Study of Algorithms Used for Feature Extraction in Facial Recognition," Int. J. Comp. Sc. and IT, 2017, vol. 8, pp. 163-166.

Real, E., "Using Evolutionary AutoML to Discover Neural Network Architectures," Google AI Blog, Mar. 15, 2018, 5 pages [Online] [Retrieved Sep. 10, 2019] Retrieved from the internet <URL: https://ai.googleblog.com/2018/03/using-evolutionary-automl-to-discover.html>.

Saenko, K., "Attentive Captioning without Attention," Lecture Notes, UC Berkeley, Mar. 2017, 64 pages.

Segall, A. et al, "Joint Call for Proposals on Video Coding with Capability beyond HEVC," JVET-HI002, Oct. 2017, 28 pages.

Sekuler, R. et al., "Motion Perception," Steven's Handbook of Experimental Psychology, Chapter 4, John Wiley and Sons, 2002, pp. 121-176.

Sheikh, H.R. et al., "Image information and visual quality," IEEE Transactions on Image Processing, Feb. 2006, vol. 15, No. 2, pp. 430-444.

(56) References Cited

OTHER PUBLICATIONS

Silver, D., "Deep Reinforcement Learning," Deep Mind, Jun. 17, 2016, 10 pages [Online] [Retrieved Sep. 10, 2019] Retrieved from the internet <URL: https://deepmind.com/blog/article/deep-reinforcement-learning>.

Sullivan, G.J. et al., "Overview of the High Efficiency Video Coding (HEVC) Standard," IEE Transactions on Circuits and Systems for Video Technology, Dec. 2012, vol. 22, No. 12, pp. 1649-1668.

Sullivan, G.J. et al., "Rate-distortion optimization for video compression," IEEE Signal Processing Magazine, Jul. 15, 1998, vol. 15, No. 6, pp. 74-90.

Sullivan, G.J. et al., "The H.264/AVC Advanced Video Coding Standard: Overview and Introduction to the Fidelity Range Extensions," Proceedings of the SPIE Conference on Applications of Digital Image Processing, Aug. 2004, pp. 1-22.

Sze, V. et al., "Efficient Processing of Deep Neural Networks: A Tutorial and Survey," arXiv, Aug. 13, 2017, pp. 1-32.

Szegedy, C. et al., "Inception-v4, Inception-ResNet and the Impact of Residual Connections on Learning," arXiv, Aug. 23, 2016, pp. 1-12.

Teney, D. et al., "Learning to Extract Motion from Videos in Convolutional Neural Networks," arXiv, Jan. 27, 2016, pp. 1-10.

Toderici, G. et al., "Variable Rate Image Compression with Recurrent Neural Networks," arXiv, Mar. 1, 2016, pp. 1-12.

Topiwala, P. et al., "Performance Comparison on VVC, AV1 and HEVC on 8-bit and 10-bit content," Applications of Digital Image Processing XLI, 2018, vol. 10752, pp. 1-10.

Video Quality Experts Group, "Video Quality Expert Group—Motivation, Objectives and Rules," Date Unknown, 6 pages, [Online] [Retrieved Sep. 10, 2019] Retrieved from the internet <URL: https://www.its.bldrdoc.gov/vgeg/about-vgeg.aspx>.

Wang, T. et al., "A novel deep learning-based method of improving coding efficiency from the decoder-end for HEVC," IEEE Data Compression Conference, 2017, pp. 410-419.

Washington University in St. Louis, "Eye's motion detection sensors identified," ScienceDaily, Jun. 16, 2015, 3 pages [Online] [Retrieved Sep. 10, 2019] Retrieved from the internet <URL: https://www.sciencedaily.com/releases/2015/06/150616190723.htm>.

Wikipedia, "List of datasets for machine-learning research," Aug. 16, 2019, 38 pages [Online] [Retrieved Sep. 10, 2019] Retrieved from the internet < URL: https://en.wikipedia.org/wiki/List_of_datasets_for_machine-learning_research>.

Wu, Q. et al., "Spiking Neural Network Performs DCT for Visual Images," ICIC, 2009, pp. 21-29.

Yang, R. et al., "Multi-Frame Quality Enhancement for Compressed Video," arXiv, Mar. 16, 2018, pp. 1-10.

Zhou, L. et al., "Convolutional Neural Network Filter (CNNF) for intra frame," JCTVC-10022, Jan. 20-26, 2018, pp. 1-9.

Zoph, B. et al., "AutoML for large scale image classification and object detection," Google AI Blog, Nov. 2, 2017, 4 pages [Online] [Retrieved Sep. 10, 2019] Retrieved from the internet <URL: https://ai.googleblog.com/2017/11/automl-for-large-scale-image.html>.

Zoph, B. et al., "Learning Transferable Architectures for Scalable Image Recognition," arXiv, Apr. 11, 2018, pp. 1-14.

Zoph, B. et al., "Neural Architecture Search with Reinforcement Learning," arXiv, Feb. 15, 2017, pp. 1-16.

Zhu, K. et al., "No-Reference Video Quality Assessment Based on Artifact Measurement and Statistical Analysis," IEEE Transactions on Circuits and Systems for Video Technology, Apr. 2015, pp. 533-546, vol. 25, No. 4.

\* cited by examiner

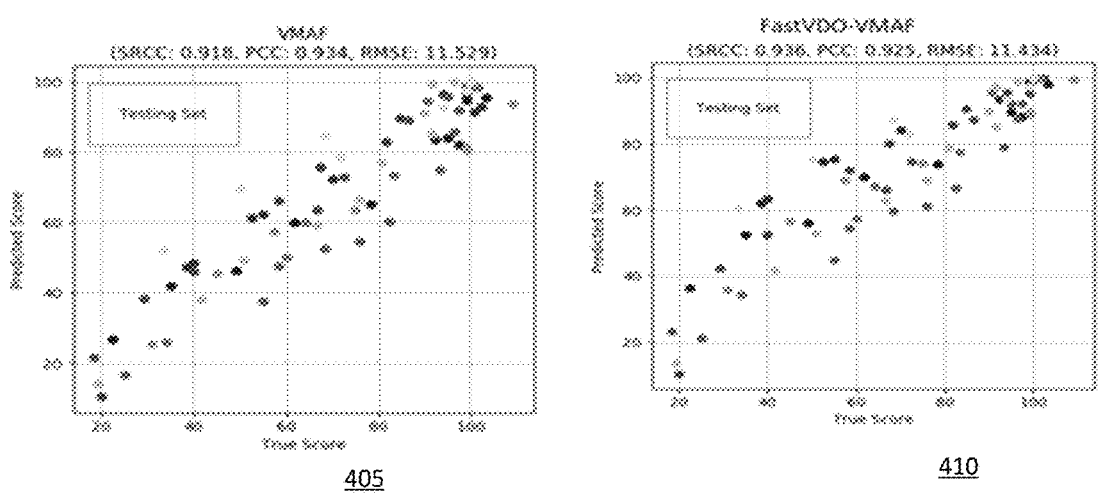
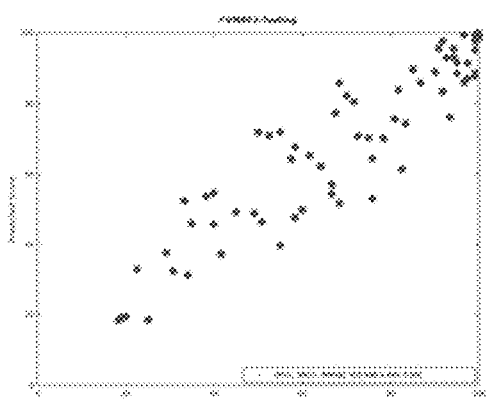
FIG. 4

| SPCC | PCC | RMSE |
|---|---|---|
| 0.956 | 0.9653 | 9.02 |
| 0.9604 | 0.9665 | 9.8 |
| 0.978 | 0.9615 | 12.13 |
| 0.9791 | 0.9702 | 10.91 |

710 brackets rows; 715 points to 0.9791; 705

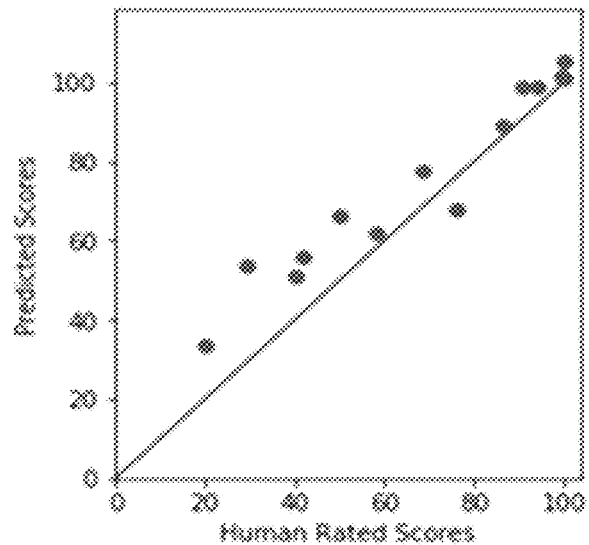

| Netflix-I Data | | | | |
|---|---|---|---|---|
| Algorithm | PCC | SRCC | Test by | Comment |
| PSNR | 0.567 | 0.511 | FastVDO | linear log |
| VMAF0.6.1 | 0.937 | 0.934 | Netflix | linear svm |
| VMAF0.6.1 | 0.934 | 0.918 | FastVDO | linear svm |
| FVMAF1 | 0.93 | 0.943 | FastVDO | linear svm |
| FVMAF2 | 0.935 | 0.945 | FastVDO | functional |
| FVMAF3 | 0.886 | 0.91 | FastVDO | NN |
| FVMAF4 | 0.967 | 0.96 | FastVDO | NN |
| FVMAF5 | 0.97 | 0.979 | FastVDO | NN |

| Netflix-II Data | | | | |
|---|---|---|---|---|
| Algorithm | PCC | SRCC | Test by | Comment |
| PSNR | 0.862 | 0.81 | FastVDO | linear log |
| VMAF0.6.1 | 0.947 | 0.904 | FastVDO | linear svm |
| FVMAF5 | 0.968 | 0.978 | FastVDO | NN |

720

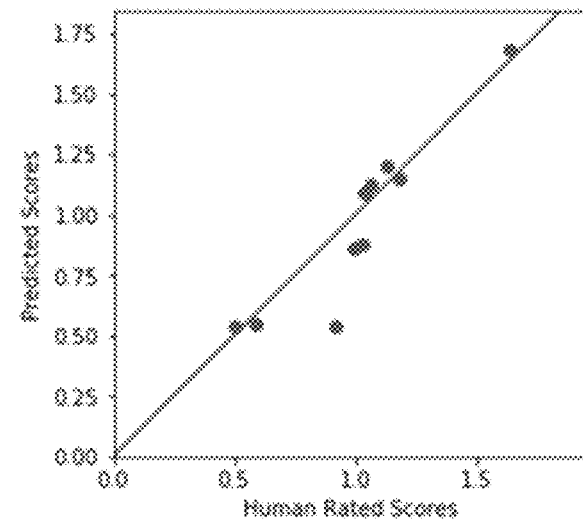

FIG. 7

| Metric | PCC | SRCC |
|---|---|---|
| sad+dm1 | 0.610 | 0.565 |
| PSNR | 0.567 | 0.511 |
| sad | -0.488 | -0.447 |
| dm1 | -0.653 | -0.646 |
| 1/sad | 0.447 | 0.447 |
| 1/dm1 | 0.551 | 0.646 |
| mse+dm2 | 0.634 | 0.524 |
| dm2 | -0.621 | -0.575 |
| mse | -0.591 | -0.512 |

| Comp. | Coeffs |
|---|---|
| sad | -2.738 |
| dm1 | -18.328 |

| Comp. | Coeffs |
|---|---|
| mse | -0.33 |
| dm2 | -0.225 |

810

805

| | Netflix-I Data | | Netflix-II Data | |
|---|---|---|---|---|
| Indiv Feat | PCC | SRCC | PCC | SRCC |
| DLM | 0.927 | 0.93 | 0.928 | 0.856 |
| DM1 | -0.707 | -0.741 | -0.817 | -0.73 |
| VIF1 | -0.707 | 0.693 | -0.817 | 0.813 |
| VIF2 | 0.793 | 0.81 | 0.922 | 0.881 |
| VIF3 | 0.756 | 0.797 | 0.931 | 0.902 |
| VIF4 | 0.716 | 0.786 | 0.934 | 0.917 |

METHOD AND APPARATUS FOR APPLYING DEEP LEARNING TECHNIQUES IN VIDEO CODING, RESTORATION AND VIDEO QUALITY ANALYSIS (VQA)

CROSS-REFERENCE TO RELATED APPLICATIONS

This application claims the benefit of U.S. Provisional Application No. 62/696,285, filed on Jul. 10, 2018, and U.S. Provisional Application. No. 62/764,801, filed on Aug. 16, 2018, both of which are incorporated by reference in their entirety.

BACKGROUND

This invention relates generally to video coding and video quality assessment, and more specifically to video quality analysis using deep learning techniques and motion-based metrics.

Lossy video compression has been one of the most successful communications technologies developed in the past few decades. While lossless compression of diverse data types such as text, speech, images, and video all generally max out at under 3:1 compression, the lossy compression of multimedia data can achieve surprisingly high levels of compression, while still offering reconstruction qualities suitable for a variety of applications, most notably surveillance, communications, and consumer entertainment. While lossy coding of all media has made significant strides in recent times, the most remarkable progress has been in video.

Current video coding standards have essentially been structured to optimize for a particular type of loss function—mean squared error, MSE (or in fact just the sum of absolute differences, SAD). However, this may be inadequate as a measure of compression loss, and better objective measures can be valuable.

SUMMARY

This invention relates to the interplay of machine learning and video processing, especially video coding. One aspect relates to measuring the quality of a processed (e.g., compressed) video relative to the source video, what may be referred to as Full Reference Video Quality Analysis (FR VQA). Another aspect relates to measuring the quality of a processed video without access to a source video, what may be referred to as No Reference Video Quality Analysis (NR VQA). In the no reference case, the VQA seeks to develop aesthetic measures, which may relate to aspects such as structural integrity, motion stability, and color consistency. The no reference case may make use of a further processed video, which may be a kind of smoothing of the processed video, to discover sharpness and structural integrity, as well as motion stability, of the given processed video. It also relates to the application of VQA in video coding and related applications. It further relates to video restoration. It further relates to the use of machine learning techniques in video quality analysis, restoration, and especially as these relate to the fields of video coding and commercial video services. In addition, it relates to the use of machine or deep learning techniques to replace every component of an image or video codec, creating a fully deep learning-based codec. While discussion will primarily focus on the full reference case, the embodiments can apply equally to the no reference case.

Embodiments of the invention are directed to a computer-implemented method for selecting a processed video. The method comprises receiving, by a streaming server comprising one or more processors and memory, an unprocessed video comprising a first plurality of frames, and generating a plurality of processed videos from the unprocessed video using a plurality of encoding schemes, each processed video generated by applying a respective encoding scheme of the plurality of encoding schemes to the unprocessed video. The method further comprises generating, for each of the plurality of processed videos, an aggregate quality or loss measure indicating a level of quality of the processed video relative to the unprocessed video. The aggregate quality or loss metric for each processed video may be determined by decoding or restoring the processed video to create a reconstructed video, and identifying a second plurality of frames of the reconstructed video corresponding to the first plurality of frames of the unprocessed video. Determining the aggregate quality or loss metric may further comprise generating at least one spatial loss measure indicating a level of difference between each of at least a portion of the first plurality of frames and respective corresponding frames of the second plurality of frames. Determining the aggregate quality or loss metric may further comprise determining one or more first motions associated with the unprocessed video, each first motion based upon one or more frames of the first plurality of frames, determining one or more second motions associated with the reconstructed video, each second motion corresponding to a first motion of the one or more first motions, and based upon one or more corresponding frames of the second plurality of frames, and generating at least one temporal loss measure indicating a level of difference between the one or more first motions associated with the unprocessed video and the one or more second motions associated with the reconstructed video. In some embodiments, measure may comprise mixed spatio-temporal measures. The generated at least one spatial measure and at least one temporal measure, or multiple spatio-temporal measures, are combined to determine the aggregate quality or loss measure for the reconstructed video. The method may further comprise selecting a processed video of the plurality of processed videos, based upon the aggregate quality or loss measures determined for each of the reconstructed videos, and performing one or more of transmitting the selected processed video or storing the selected processed video on a storage device.

In some embodiments, the server receives just a processed video (but not the original source video) and creates a second, further processed video (e.g., a smoothed version, by applying a Gaussian smoothing operation), and compares the processed video to the smoothed processed video by spatio-temporal processing. This allows to discover how sharp, structurally coherent it is, both spatially and temporally. A VQA can be constructed then by comparing the statistical spatio-temporal features of the given processed video to the known features of videos in a database of videos. The VQA can be developed as based on some kind of distance to the measures, or by a learning based method of comparison based on neural networks.

BRIEF DESCRIPTION OF THE DRAWINGS

FIG. 4 illustrates graphs showing performances of different VQAs, in accordance with some embodiments.

FIG. 7 illustrates graphs showing performance of a FVMAF determined using larger neural networks, in accordance with some embodiments.

FIG. 8 illustrates a table showing test results using a VQA based upon SAD and DM1, in accordance with some embodiments.

The figures depict various embodiments of the invention for purposes of illustration only. One skilled in the art will readily recognize from the following discussion that alternative embodiments of the structures and methods illustrated herein may be employed without departing from the principles of the invention described herein.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures.

System Environment

Figure 1:
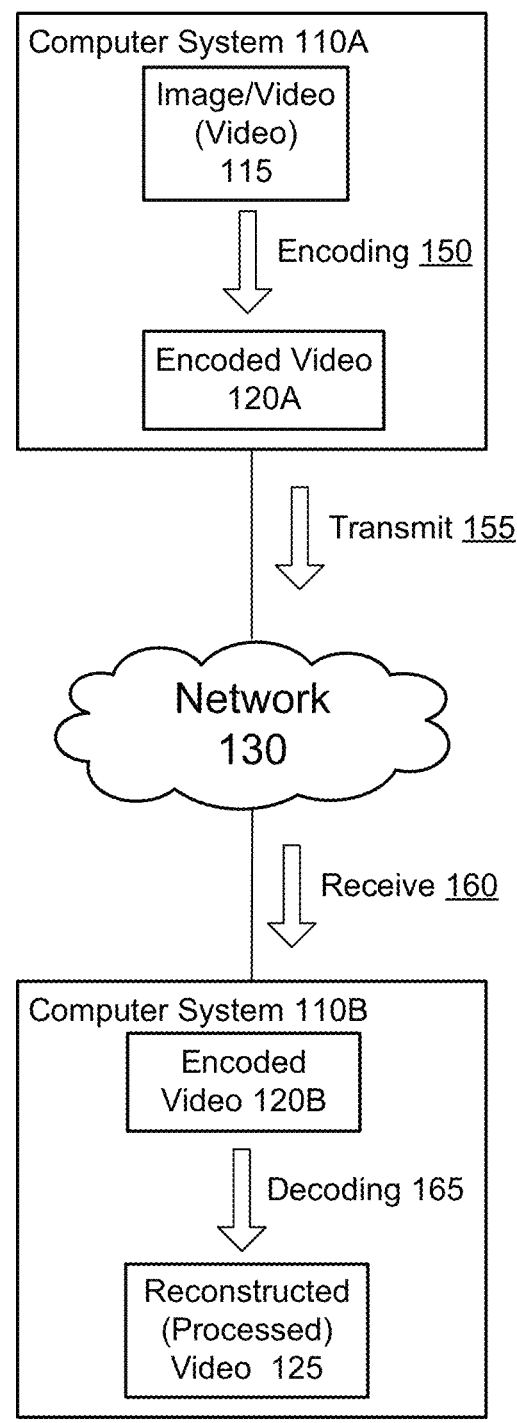
FIG. 1 is a high-level block diagram that illustrates a computing environment 100 for encoding and decoding images/videos, according to one embodiment of the present disclosure.

FIG. 1 is a high-level block diagram that illustrates a computing environment 100 for encoding and decoding images/videos (herein referred to as videos), according to one embodiment of the present disclosure. As shown, the computing environment 100 includes two computer systems 110A and 110B connected through a network 130. In one embodiment, the computer system 110 is a conventional computer system executing, for example, a Microsoft Windows-compatible operating system (OS), Apple OS X, and/or a Linux distribution. In another embodiment, the computer system 110 can be a device having computer functionality, such as a personal digital assistant (PDA), mobile telephone, video game system, etc.

FIG. 1 and the other figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "110" in the text refers to reference numerals "110A" and/or "110B" in the figures).

The network 130 enables communications between the computer systems 110. In one embodiment, the network 130 uses standard communications technologies and/or protocols. Thus, the network 130 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 130 can also include links to other networks such as the Internet.

The computer system 110A encodes 150 an original video 115 to generate an encoded video 120A. The original video can be, for example, a still image or the frames of a video. The encoding 150 compresses the original video 115 to produce an encoded, or "compressed," video 120A that represents the original video using less information (e.g., fewer bits) compared to the original video 115. The encoded video 120A thus provides for efficient storage of the information in the original video 115.

The encoded video 120A also allows for efficient transmission 155 of the information in the original video 115 over the network 130. For example, the encoded video 120A can be transmitted 155 by the computer system 110A over the network 130 and received 160 by computer system 110B. The encoded video 120B received by computer system 110B represents the copy of encoded video 120A held by computer system 110A. The computer system 110B can decode 165 the encoded video 120B to obtain a replica 125 of the original video or an approximation of the original video, the "decompressed" video. This transmission scenario can occur, for example, when a user is using computer system 110B to browse the web and download images or videos from web sites. The videos can be still images, frames of videos stored in a file videos streamed to computer system 110B. The encoding/decoding techniques described herein can also be used in non-networked environments.

In one embodiment, the encoding process 150 used by computer system 110A uses a block-based technique. In this technique, the video frame is divided into a set of blocks, such as blocks of 16×16 pixels. The blocks are encoded in a specified sequence, such as a scan-line order from left-to-right, top-to-bottom. A block in the video frame to be encoded, called a "target block," is encoded by describing the differences between the target block and another block in the reference video frame, called the "reference block." Said another way, the reference block is used to "predict" the target block, and the resulting difference (error) of this prediction is encoded.

The degree of the encoding (i.e., amount of compression) is determined in part by the amount of information required to predict the target block from the reference block and the amount of information required to identify the reference block. An embodiment of the encoding process 150 provides a set of candidate blocks from which to select the reference block, and also provides an efficient way to identify the selected block. Heuristics are used for identifying the set of candidate source blocks, for example, source blocks are selected from within a cluster of similar blocks obtained by k-means clustering of blocks. For a target block, a region adjacent to the target block is identified and a set of candidate source blocks along with candidate source regions adjacent to the candidate source blocks are identified. The candidate source regions are ranked based on the differences between the candidate source regions and the information from the target block and the region surrounding the target block that is available at the decoder. Each candidate source block is described using its rank and residual information describing differences between the candidate source block and the target block. The candidate source block that can be described using a minimum amount of information and total distortion is selected as the reference block that predicts the target block. The residual information and the position of the reference block in a sequence of candidate source blocks is stored in the compressed image.

The corresponding decoding process 165 decodes the encoded image 120B block-by-block. Blocks of the image 125 that have been decoded may be used to decode subsequent blocks. Aspects of the image using during encoding, such as the ranks of the candidate source regions are reconstructed during decoding and used to produce the replica 125 of the original image 115.

Over the past few decades of development, the compression efficiency of video coding has increased dramatically, from VCD standards which aimed at approximately 25:1 compression to H.265/MPEG-H HEVC and H.266/MPEG VVC, which aim for up to 500:1 and 1000:1 compression. As such, video compressed using current methods may aim to represent data at a rate that is one-tenth of one percent of the original video.

Figure 2:
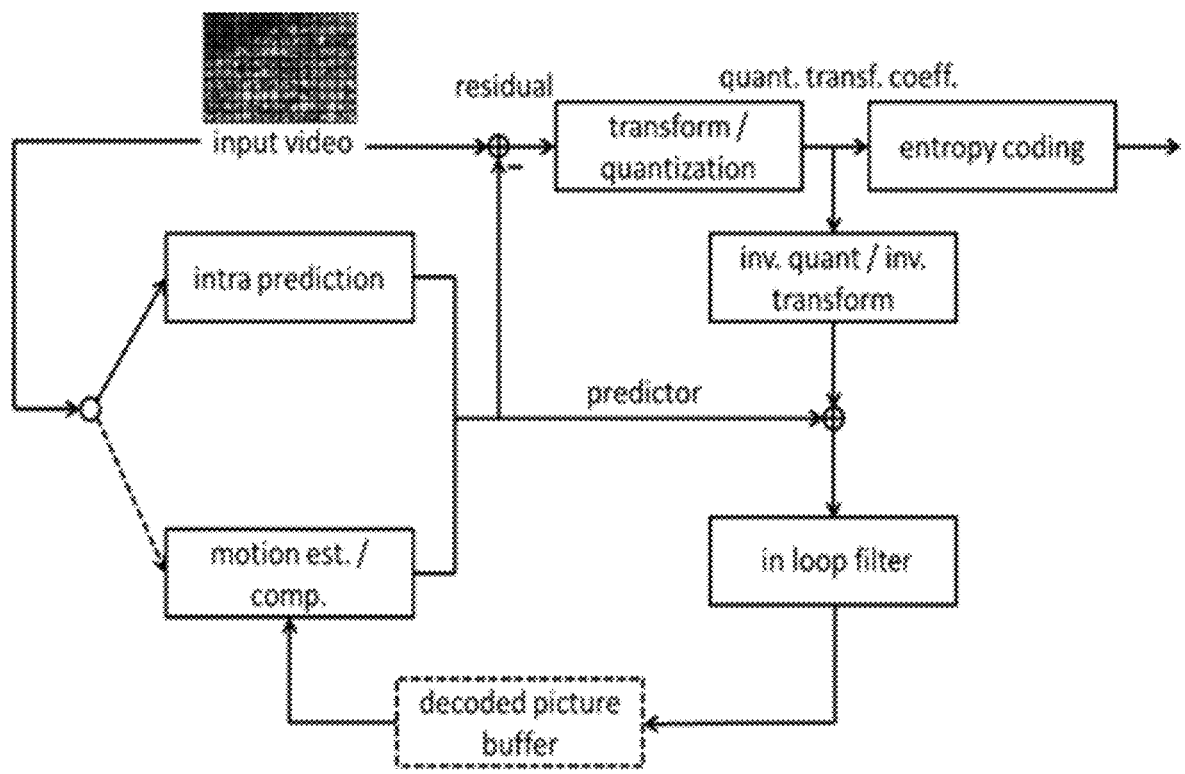
FIG. 2 illustrates a block diagram of a video coding system, in accordance with some embodiments.

FIG. 2 illustrates a block diagram of a video coding system, in accordance with some embodiments. The video coding system of FIG. 2 may be used to perform the encoding 150 illustrated in FIG. 1. As illustrated in FIG. 2, an input video (e.g., an unprocessed source video) is processed by an encoder including an intra-prediction module and/or a motion estimation/compensation module to generate a spatial or temporal prediction. The prediction is used to generate a residual representing the difference between the prediction and the original video. The residual may be transformed and quantized to generate quantized transformed coefficients to be coded. In addition, the quantized transformed coefficients may be subject to inverse quantization and transformation for use in reconstructing block from previous frames for use in motion estimation.

This basic structure of video codecs, using a hybrid, motion-compensated residual coding design with predictors, filters, transforms, quantizers, and entropy coders (e.g., as illustrated in FIG. 2), was first proposed in the 1970s, and has been maintained over many years, adding only sophistication and complexity to each of its component parts. Thus, coding efficiency gains have come mainly from two key factors: increasing video resolutions, and increasing operations per pixel, based on increasing compute densities available. Under this structure, all codec designs have essentially been structured to optimize for a single loss function—mean squared error, MSE (or just the sum of absolute differences, SAD). In order to achieve further visual quality improvements, in and beyond H.266/VVC, improved visual quality assessment measures may be needed.

A modern encoder, working on a high-resolution video, must make millions of coding decisions per second, each based on rate distortion optimization (RDO) calculations. While rate can be reasonably estimated, distortion is much harder. The impact of improving the measure of distortion, even marginally, can thus be dramatic. Current video coding standards are generally structured to optimize for a particular type of loss function between corresponding frames of a source video and a processed (e.g., coded video), such as mean squared error (MSE) or sum of absolute differences (SAD), or variations thereof, such as the MSE-based metric Peak Signal-to-Noise Ratio (PSNR). However, MSE and/or SAD metrics between the source video and the processed one may be inadequate measures of loss of video quality, and thus, inadequate measures of quality of a processed video.

While it is true that asymptotically as MSE/SAD goes to zero, the processed video becomes identical to the source (meaning that these are true loss functions). However, as a measure of visual loss, MSE/SAD-based measures, being averaged over all areas of frames, and over all frames, may be inadequate in capturing how much visual loss is incurred in the processing of a video. For example, MSE (and SAD) measure only differences between individual frames of the processed video to the source, but do not consider any temporal information in these videos. In addition, other video quality metrics, such as the Structural Similarity (SSIM) metric, introduced in 2004, operate only as an image quality analysis (IQA) metrics, and fail to take motion into account. In fact, the history of video quality analysis has been mainly one of IQAs, not true VQA, due to IQA being easier to treat, while motion is harder to get a handle on. However, the main feature of video is motion (that is why movies are called motion pictures), which is not in any way accounted for in these measures. As such, these measures do not correlate highly with human ratings of quality of videos, and improved measures are needed to better account for human vision and how humans perceive video quality.

The Video Multi-Assessment Fusion Metric (VMAF) introduced by Netflix in 2016 takes a couple of existing IQA metrics, and linearly combines them with an elementary motion measure that Netflix developed. If an original (e.g., uncompressed) video sequence is a set of frames $\{F\_k\}$, $k=0, \ldots, K$, VMAF uses the Sum of Absolute Frame Difference (SAFD) as a motion feature (referred to as a Mean of Co-located Pixel Difference), where $\|*\|$ is the L1-norm. As such, that the difference of frames captures the change in pixels, reflecting motion (hereinafter also referred to as "M", for motion) with the original video. However, although VMAF does contain an elementary measure of motion (M), it does so only on the reference source video, and has no information about the motion in the processed video.

In some embodiments, a relative motion measure between the source and the processed video is used for accessing the quality of a processed video (e.g., a distorted video) relative to an original source video. Specifically, for original video frames $\{F\_k\}$, $k=0, \ldots, K$, and distorted video frames $\{G\_k\}$, $k=0, \ldots, K$, since the frame difference of frames within a video corresponds to motion (reflected by changes to pixels), temporal motion based metrics may be based upon a difference of frame differences. The difference of frame differences may hereinafter be referred to as "DM" for differential motion.

In some embodiments, differential motion between a source video and a distorted video may be based upon a plurality of temporal error measures "$E_{temp}$" corresponding to different frames of the videos. For example, in some embodiments, temporal error may be determined using Equation (1) below:

$$E_{k,temp} = \|(F_k - F_{k-1}) - (G_k - G_{k-1})\| \quad (1)$$

Although Equation (1) above expresses temporal error $E_{temp}$ in terms of L1-norm, in other embodiments, the temporal error $E_{temp}$ may be expressed using L2-norm, Lp, entropy, and/or the like. When the motion information matches between the original and distorted videos, the temporal error $E_{temp}$ will be zero. In combination with purely image-based measures, this can lead to metrics for accessing video processing quality.

While Equation (1) illustrates a particular way in which motion in a video can be determined, in other embodiments, motion within a source or processed video may be determined or estimated in other ways. For example, additional examples of estimating motion in videos are described in U.S. Pat. Nos. 9,524,028 and 9,829,984, both of which are incorporated by reference in their entireties.

In some embodiments, motion-based metrics are combined with additional IQA metrics to create an updated measure for assessing video processing quality. The combination may be a linear combination based on other types of functions, or some combination thereof, as will be described in greater detail below. Because the updated measure takes into account motion of the source video relative to motion of the distorted video, the combined measure may more accurately reflect the quality of the distorted video relative to the original video as perceived by human eyes.

It is recognized that many aspects of human vision and intelligence are non-linear. For example, human perception of the loss of video quality may not decompose linearly into spatial loss and temporal loss. Instead, it is more likely that, in the human visual system, spatial and temporal information are combined in a nonlinear way to create perception of action, which should apply to the perception of loss of quality. Thus, in some embodiments, nonlinear integration of spatial and temporal loss may be used. For example, in some embodiments, these measures of loss may be combined as a power series. Some models attempt a simplification as a cascade of linear and a static nonlinear function.

In some embodiments, it may be possible to model aspects of human vision (and perhaps all of human intelligence) using deep neural networks. As such, deep learning may be used in some embodiments to discover a nonlinear functional form for the perception of visual loss, in terms of spatial and temporal losses. A deep neural network may receive, as inputs, a number of available features (spatial, temporal, and spatiotemporal), and one or more measures of loss (or of quality) comparing a processed video (PV) to an original video (V).

In some embodiments, a neural network processes one or more features based on V and PV, and returns a single numerical output (e.g., a VQA metric indicating a level of quality of the processed video relative to the original video). These features may be pre-selected hand-tuned features, built from the videos themselves. In other embodiments, a neural network model may receive the videos V and PV, and determine one or more features through machine learning. For example, features of images (e.g., video frames) may be derived by various stages of filters and downsamplers. Features for video may be determined similarly. However, since video is a three-dimensional (3D) input, the filters and downsamplers must also be 3D.

Overview of Deep Learning Techniques

Neural networks (NNs) hold a promising avenue for many applications but may need extensive training to be useful. In convolutional neural networks (CNNs), convolution layers are trained to automatically find the most useful features directly and hierarchically from the data itself, while the final, fully connected layer with a softmax activation may categorize the images into discrete classes. In some embodiments, differentiability assumptions on functions and the chain rule allow backpropagation training, where nodes are reweighted according to whether they contributed to a (in)correct outcome, and repeated forward/backward propagation is used to find weights that work well. In some embodiments, rectified linear unit (ReLU) activation can be used (e.g., only one non-differentiable point), where its derivative is 1 for positive x, easing the well-known vanishing gradient problem when training a large system by gradient descent. In some embodiments, interlayer identity maps (f(x)=x) can be added to network architectures to provides further help, since their derivatives are also 1.

In some embodiments, CNNs are used for image recognition tasks, being able to exploit spatial structures (e.g., edges, texture, color), while recurrent neural networks (RNNs) can be used to take on tasks that involve temporal processing (such as with natural language: speech, text). In some embodiments, these neural network types can also be combined, in sequence, for example to create text annotations for images and video. For example, for segmentation of image/video data, some combination of these two architectural types can be used. In image annotation applications, the information itself is static in an image, but the annotation requires natural language, which is not static but involves temporal processing. On the other hand, in video data, the information itself has both spatial and temporal dimensions, and as such can be more complex. In some embodiments, CNNs can be used for accurately recognizing digits, such as license plates and even handwritten digits. In addition, CNNs can be used backwards to deep dream, creating dreamlike images starting from captured ones, by flowing slowly in output parameter space away from a given point. In fact, deep NNs can not only be representative of source data, but even auto-encode—e.g., generate (decode) originals, or fully realistic fakes, analogous to image/video compression, where an encoder creates a sparse (but faithful) representation, and a decoder creates that reconstruction.

In some embodiments, a neural network can be trained using Generative Adversarial Networks (GANs). A GAN may be characterized as a contest of two NNs, one creates fakes, the other judges their realism. In some embodiments, an autoencoder NN is a sequence of nonlinear mappings, which represent source data, and a decoder segment back to the original domain, where the Lagrangian cost is minimized for fidelity of representation, but Z is lower dimensional. Using these techniques NN auto-encoders can be trained to imitate all aspects of compression (e.g., predictors, filters, transforms, quantizers, entropy coders) to achieve data reduction results similar to that of traditional video compression. Equation (2) below describe an auto-encoder that may be implemented using neural networks, in accordance with some embodiments.

$$X \xrightarrow{f} Y \xrightarrow{g} \ldots \xrightarrow{h} Z \xrightarrow{l} \ldots \xrightarrow{m} X, \quad \text{combined } X \xrightarrow{P} X. \quad (2)$$

$L(x, z) = \mathrm{argmin} \|x - F(x)\|^2$, but $Z$ is chosen lower dimensional

Reinforcement Learning

Reinforcement learning (RL) allows AI systems to learn on their own, entirely from experience, by learning a policy of action that maximizes a reward. For example, an AI system may learn strategies for playing a game by learning successful moves simply by playing millions of games, and rewards (win or lose) are used to modify the approach to playing. Similar to how backpropagation is used in neural networks to supply a neural weight gradient according to its partial contribution to success, RL supplies a policy gradient, e.g., in a strategy, by its partial value in winning. Since policy choices are often discrete, in applications with smooth functions, probabilities can be assigned for the various policy choices, and adjusted during the learning process. Values can then be chosen according to the probabilities. As such, RL generalizes gradient-descent learning by backpropagation. In some embodiments, viewing the action of NNs with given weights for performing an action (e.g., classification) as policies, policy gradients can be reduced to actual gradients.

Figure 3:
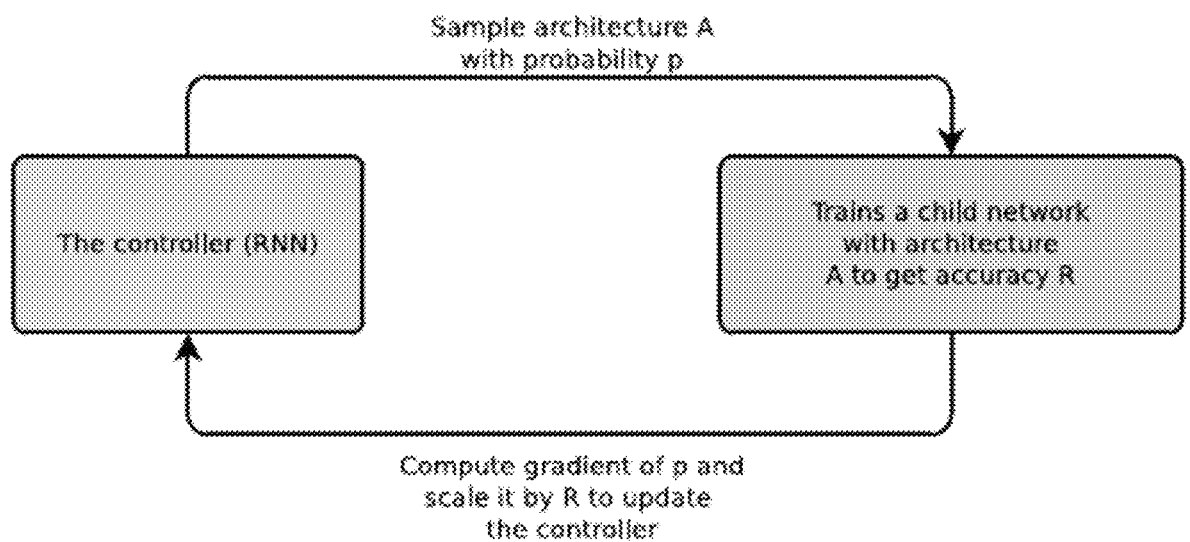
FIG. 3 illustrates a block diagram of a neural architecture search process that may be used in some embodiments.

FIG. 3 illustrates a block diagram of a neural architecture search process that may be used in some embodiments. A controller NN (e.g., an RNN) samples an architecture A with probability p, thus creating an instance child network, whose performance on a given task, say image classification, results in accuracy R. In some embodiments the architecture comprises a plurality of components, each associated with a respective probability p.

Over one or more iterations, the probability p is adjusted by scaling its gradients by control parameters based upon the accuracy R, to generate more accurate models with increased probabilities. The recurrent neural network controller learns over time which architectural components were the most successful. Since it is designed to increase the reward (success) it eventually develops a powerful, successful, and compact design that works on the initial test problem. Finally, the test set can be changed, and the process restarted.

Use of Deep Learning Techniques in Video Coding and Restoration

Neural networks can be deployed to perform many of the functional tasks that are performed in the design of a modern video codec, such as predictors, filters, transforms, quantizers, and even entropy coders. For example, predictors such as motion estimators and intra-predictors can be designed using NNs. In some embodiments, transformation modules, e.g., for performing DCT-like (discrete cosine transform) transforms, and quantization modules can be constructed using CNNs. As such, in some embodiments, a full end-to-end image codec can be built by using neural networks, which moreover allows adjustment of the data rate.

In addition, NNs may be used in reconstructing or restoring a video post-processing (e.g., post compression). With both distorted and original content available, a NN can be trained to modify the distorted content (block-by-block) in the direction of the original content. In some embodiments, restoration may be used as a post-loop filter in the decoder, and/or as a post-decoding restoration processing, in order to increase image quality and reduce artifacts such as blurring, ringing, etc.

Video Quality Analysis/Assessment (VQA)

While DL can be used to perform various functions used in video compression, as discussed above, in some embodiments deep learning techniques may also be applied to video quality measurement applications. These techniques may find use within the digital video services industry, which may include broadcast TV, streaming, video chat, etc. Critical to the success of the digital video services industry is providing the highest quality video afforded by receivers and channel capacities. While a true measure of video quality, also referred to as video quality assessment (VQA), may be best done by subjective testing (e.g., by humans), this is impossible when handling millions of streams like Netflix or YouTube. Instead, an objective metric called peak-signal-to-noise ratio (PSNR) has long been in used, developed more for computational ease than reliability. Recently, new objective metrics such as Structural SIMiliary (SSIM) and Visual Information Fidelity (VIF) have been introduced, which have made some improvements over simple PSNR. However, the need to have an objective metric which is both easy to compute and has predictive power for subjective quality with very high reliability remains.

For down-to-earth video quality applications in the field of video compression, we have a source or reference video, consisting of uncompressed video and considered pristine, and various processed (e.g., compressed) versions for use in applications such as streaming or broadcast, which are distorted. A goal of Video Quality Assessment is to find an objective metric that correlates well with human ratings of videos quality. Since human ratings will vary among test subjects, VQAs typically aim to correlate with a mean opinion score (MOS) of human ratings. In some embodiments, how well a given VQA correlates with the MOS may be measured based upon a Pearson Correlation Coefficient (PCC) or a Spearman Rank Order Correlation Coefficient (SPCC or SRCC). For random variables X, Y, the correlation between X and Y using the PCC and the SRCC may be defined as shown in Equations (3) and (4) below.

$$PCC(X, Y) = \frac{(E[(X - \mu_X)(Y - \mu_Y)])}{\sigma_X \sigma_Y} \quad (3)$$

$$SRCC = PCC(rk(X), rk(Y)), \text{ where } rk(X) = \text{rank order of } X \quad (4)$$

VQA may be used for a variety of different applications. In some embodiments, VQA can be used in stream selection. For example, a source video may be processed (e.g., encoded) using a plurality of different processing schemes (e.g., encoding schemes) to produce a plurality of respective processed videos. The quality of each of the processed videos may be evaluated, and a video having a highest quality is selected (e.g., for stream or transmission). In some embodiments, stream selection may be performed as part of an offline application. Stream selection is valuable in both full reference and no reference applications. In both cases, neural networks can play a key role.

In some embodiments, VQA is used in receiver video restoration. When a receiver receives a processed video, the receiver may perform one or more operations to restore the processed video to improve the visual quality of the received video. For example, one or more restoration operations may include correcting for visual artifacts and/or reducing blurring, ringing, etc. in the received video. VQA can be used to assess the visual quality of the restored video and select for one or more restoration operations for producing a restored video having a highest visual quality. In some embodiments, receiver video restoration applications may be combined with deep learning to train blocks of video frames on the original video, which can provide effective restoration in compressed and other distorted videos. In some embodiments, receiver video restoration may be performed offline or online (e.g., as a streaming video is received). Note that restoration may be performed in either full reference and no reference cases. In the full reference case, the goal is to restore to as close as possible to the original. In the no reference case, the goal is to improve the quality according to the no reference VQA, which may incorporate such elements are sharpness, breadth of the histogram, color saturation levels, and motion smoothness. In some embodiments using a neural network framework, these can be all implicitly incorporated.

In some embodiments, VQA is used for encoder optimization to decide how best to encode a video with a given codec (e.g., code for true visual quality). For example, VQA may be used to evaluate various parameters for encoding the video using the codec, in order to select parameters that would result in a video having a highest quality level. In some embodiments, while stream selection (e.g., performed at a server) and restoration (e.g., performed at a at receiver) can require real-time performance, and thus pose complexity constraints, the use of VQA in encoding applications may be the most constrained, due to a rate at which decisions may need to be made.

In applications where VQA is determined encoder-side, the VQA may, in some embodiments, indicate a quality of a reconstructed video reconstructed from a processed (e.g., encoded) video. For example, the encoder may reconstruct processed frames of the video for use in prediction when processing subsequent frames. As such, in some embodiments, the VQA may be determined based upon these reconstructed frames instead of the processed frames. While encoding from an original source must be with respect to a reference, this process may also encompass transcoding from an already encoded input, in which case it is the closest thing to a reference. For low quality input sources, a combination of transcoding along with no reference restoration can even improve the quality of the input relative to aesthetics. This is commonly practiced in applications with user generated content, which is often of low quality.

Modern encoders rely on using rate-distortion optimization (RDO) to make encoding decisions, based on an interplay between distortion D, and the rate R, to optimize the Lagrangian (where A is a constant called a Lagrange multiplier). In some embodiments, the Lagrangian may be determined in accordance with Equation (5) below:

$$L = D + \lambda R = \sum_i D_i + \lambda R_i; \qquad (5)$$

$$\delta L = 0 = > \delta L_i = 0 = > \lambda = -\frac{D_i}{R_i}, \text{ a constant.}$$

Thus, given any number of independent parameters to optimize (e.g., various pixel quantizers), R and D may be jointly optimized when the slopes of negative distortion over rate are all equal. In coding a high-definition video (e.g., a 4K video), a modern encoder such as H.265 may need to make millions of RDO decisions per second, on everything from mode selection and motion estimation, to quantization and filtering. Since many video applications require real-time encoding (e.g., live events), usually in hardware, this puts severe constraints on how RDO can be computed. While the rate R may be relatively straightforward (e.g., how many bits it takes to encode the data, though this can be estimated to save cycles, instead of computed), computing or estimating the distortion D (e.g., based upon comparing a coded M×N block B to the reference version of the block) can be more open. Typically, the simple mean squared error (MSE) or L2-norm has been used to represent the block-based spatial error $E_{k,spat}$, or the further simplified Sum of Absolute Differences (SAD, or L1-norm), in order to avoid needing to perform squaring operations. Equations (6) and (7) illustrate how spatial error may be calculated based upon SAD and MSE, in accordance with some embodiments.

$$E_{k,spat} = SAD = \sum_{i,j=1}^{M,N} |B_{ref,i,j} - B_{coded,i,j}| = \|F_{ref} - F_{coded}\|, \text{ the } L1 \text{ norm.} \qquad (6)$$

$$E_{k,spat} = MSE = 1/MN \sum_{i,j=1}^{M,N} |B_{ref,i,j} - B_{coded,i,j}|^2; \qquad (7)$$

$$PSNR = 10 * \log(255^2/MSE)).$$

For many years, coded videos have been graded by PSNR values, while the internals of the video codecs typically use SAD to optimize encoding decisions. As mentioned, up till now all VQA metrics in wide use were really Image QAs (IQAs). In addition, the "motion" feature used in VMAF makes no use of the distorted video at all, and as such does not reflect differences in motion between the original and processed videos.

While applying a VQA at an encoder may impose restrictions on level of complexity (due to the need for encoding decisions to be performed quickly in real time), determining the VQA can, in some embodiments, take advantage of the benefit of having at hand the actual motion estimation used in the encoder. In some embodiments, the motion estimation may be used to determine one or more temporal metrics (e.g., differential motion metrics). The determined temporal metrics can further be combined with one or more spatial metrics (e.g., IQA metrics) to determine a fused metric that accounts for both spatial and temporal differences between the original and processed videos. In some embodiments, the spatial metrics may include the Visual Information Fidelity (VIF), and the Detail Loss Metric (DLM). Both VIF and DLM are based on extracting features from images in the wavelet transform domain for multiscale processing.

In some embodiments, where an original (uncompressed) video sequence is a set of frames $\{F_k\}$, k=0, . . . , K, a measure of motion within the video can be determined based upon the Sum of Absolute Frame Difference (SAFD) as a motion feature, where $\|*\|$ is the L1-norm. This motion feature (referred to as "M", for motion) may be determined using Equation (8) below:

$$SAFD = \sum_{k=1}^{K} \|F_k - F_{k-1}\| \qquad (8)$$

or $$\sum_{k=1}^{K-1} \min\{\|F_k - F_{k-1}\|, \|F_{k+1} - F_k\|\}.)$$

While M can be informative about how much motion is in the video (and thus in part how difficult it may be to compress), it does not contain any information concerning the quality of the motion in a distorted stream (e.g., a compressed stream and/or a reconstructed stream).

In some embodiments, additional metrics are determined in order to reflect motion of the distorted processed video relative to the original unprocessed video. As used herein, an unprocessed video may refer to an original video that has not undergone encoding or other processing, or to a video that has undergone previous processing (e.g., encoding) but is subject to further processing to generate a processed video.

For example, in some embodiments, VQAs as described herein may be used to determine a level of fidelity or loss between an original unencoded video and an encoded video, between an encoded video and a version of the encoded video having undergone subsequent processing (e.g., reconstruction, smoothing, etc.), and/or the like. As such, in some embodiments, unprocessed or original video may be used to describe a video that has not undergone one or more processing steps used to generate a distorted or processed video.

In some embodiments, for original video frames $\{F_k\}$, k=0, ..., K, and distorted video frames $\{G_k\}$, k=0, ..., K, since the frame difference precisely corresponds to motion (all changes to pixels), temporal motion based metrics using the difference of frame differences (key innovation/simplification) can be determined. In some embodiments, this may be referred to as differential motion, or "DM." In some embodiments, DM may be determined using based upon $E_{k,temp}$ (which may be determined using Equation (1) above). The temporal error measure $E_{k,temp}$ may be determined using L1-norm, L2, Lp, entropy, etc.

The temporal error measure $E_{k,temp}$ is zero when the motion information matches between the original and distorted videos. The temporal area may be combined with purely image-based measures (such as VIF and/or DLM) to generate a metric for assessing video quality that takes into account both spatial and temporal distortion. In some embodiments, VQAs that include both spatial and temporal measures (e.g., differential motions DM) may be referred to as Fast VDO Video Multi-Assessment Fusion Metrics (FV-VMAF or FVMAF). Different types of FVMAFs are discussed in greater detail below.

The differential motion represents the mismatch between the true and distorted motion, and thus indicates a temporal motion error. In some embodiments, the temporal motion error formulated at the frame-level. However, it is understood that in other embodiments, this measure can be developed at a sub-frame level as well, such as slice, tile, block, or even sub-block level. In some embodiments, these measures may be within the prediction loop, such as in applications in encoder optimization. In addition, these metrics can be developed by taking any of L1, L2, Lp, or Entropy. The temporal motion error can be combined with spatial error to determine a video quality metric for the processed video. In some embodiments, temporal error and spatial error may be combined linearly. In other embodiments, the temporal and spatial errors are combined non-linearly. For example, a video encoder may determine a distortion measure when performing RDO as a linear combination in accordance with Equation (9) below:

$$D = aE_{k,spat} + bE_{k,temp}, a+b=1, a,b>0. \tag{9}$$

In some embodiments, deep learning models are used to combine different measures (e.g., spatial and temporal error measures) into a VQA. In an embodiments, loss measures are normalized so that they are mappings from a pair of videos (an original, and a processed video) into the unit interval (e.g., $\{V,PV\} \to [0, 1]$). In some embodiments, where the VQA is a no reference VQA (NR VQA), the mapping may be PV $\to$ [0, 1], due to the unprocessed video V being suppressed, which is a special case of the more general case $\{V, PV\} \to [0, 1]$ described above.

In some embodiments, determined spatial loss measures may apply locally, on pairs of frames $\{F_k, G_k\}$, for each k, individually (or locally in k). Similarly, the temporal loss functions may be determined to apply locally on just pairs $\{F_k, F_{k-1}, G_k, G_{k-1}\}$, for each k, individually. The resulting loss measures are local, and may be of the form expressed in Equation (10) below.

$$\{F_k, G_k\} \to [0,1](\text{spatial loss}), \text{ or } \{F_k, F_{k-1}, G_k, G_{k-1}\} \to [0,1](\text{temporal loss}) \tag{10}$$

In some embodiments, spatial and temporal losses may be combined to form a spatiotemporal loss measure, which may be of the form shown in Equation (11) below. The general spatiotemporal loss expressed in Equation (11) above incorporates not only motion information, but also the continuity of motion representation.

$$\{F_k, F_{k-1}, \ldots, F_{k-1}, G_k, G_{k-1}, \ldots, G_{k-m}\} \to [0,1](\text{more general spatiotemporal loss}) \tag{11}$$

In some embodiments, instead of modeling loss functions (e.g., as in Equations (10) and (11)), a VQA can be modeled. VQAs are notionally the inverse of loss functions (much like MSE and SAD are loss functions, but PSNR is a VQA). For example, when developing models of total loss functions, then 0 may represent 0 loss (perfect), and 1 the maximum loss in the range. On the other hand, when developing video quality measures, then 0 may represent poorest quality, and 1 the highest (perfect) quality. To combine loss functions and VQAs (e.g., aggregating loss functions to determine a VQA), either the loss functions or the VQAs may be inverted to make them compatible (e.g., when using a support vector machine (SVM) to perform linear regression, some will get positive coefficients, and some negative).

As such, the measures discussed above for determining distortion D may be used as part of a loss function to determine a level of loss, or as part of a quality metric. With these qualifiers, the generic form of the functional model for distortion depending on several spatial and temporal measures can be expressed in the form of Equation (12) below.

$$D = f(\text{spatMeas}1, \ldots, \text{spatMeas}K, \text{tempMeas}1, \ldots, \text{tempMeas}L). \tag{12}$$

In some embodiments, a model may utilize one or more spatial measures (e.g., VIF, and DLM), and one or more temporal measures (e.g., DM, as discussed above). In some embodiments, a VQA may be expressed as a power series using Taylor's theorem (assuming sufficient smoothness of the function), as shown in Equation (13) below:

$$\text{Const.} + a1*\text{spatMeas}1 + \ldots + aK*\text{spatMeas}K + b1*\text{tempMeas}1 + \ldots + bL*\text{tempMeas}L + \text{higher order terms} \tag{13}$$

In Equation (13) above, the constant term (Const.) may typically be 0, as a constant quality independent of the various measures is not expected. As such, in some embodiments, the VQA can based upon the linear terms for the spatial measures, as well as the linear terms for the temporal measures, allowing the VQA to take into account both spatial and temporal aspects of the distorted video relative to the original video. In some embodiments, the linear terms may correspond to predetermined constant values, or both determined using a machine learning model (e.g., by SVM). In some embodiments, the VQA may be more complex and further contain higher order terms. In some embodiments, one or more of the higher order terms (e.g., second order terms) may be determined individually, or treated simply as new, more generalized measures, and machine learning (e.g., SVM) can be used to find the linear coefficients. For example, in some embodiments, a second order term may be determined as a product of one or more first order terms (e.g., a product of a spatial measure and a temporal measure), which may be analyzed individually or part of a linear combination of measures (e.g., as shown in Equation (13)).

In some embodiments, the VQA is represented using a compound function (e.g., a cascade of two or more functions). For example, the output space [0, 1] of a first function of the compound function is used as the input to a next function of the compound function. In some embodiments, the output space (e.g., [0, 1]) can be segmented into subregions, with a different functional model used in each segmented subregion. As such, an initial linear model can be elevated to a linear followed by piecewise-linear (PWL) model (or PW polynomial, or other higher order function).

In some embodiments, instead of an explicit functional model, a neural network can be used to generate a more generalized metric for determining VQA. Equation (14) shows an example of a generalized VQA model, in accordance with some embodiments.

$$D=NN(\text{spatMeasures}, \text{tempMeasures}). \tag{14}$$

Given a video V, and a processed video PV, various elementary measures of V and PV (e.g., spatial measures and temporal measures) can be computed. These are then the input to the model NN, and the output is a VQA number, in the range [0, 1]. In some embodiments, the model may be further generalized. Instead of using specific hand-tuned elementary measures, in some embodiments, the VQA may be determined based upon Equation (15) below:

$$D=NN(V, PV). \tag{15}$$

As shown in Equation (15) above, the inputs to the neural network may comprise the entire videos (original video V, and processed video PV). However, with high-definition videos (e.g., videos with 1080p or 4K images), this may cause the model to potentially have billions of inputs, with 100B's of nodes, and trillions of weights. In some embodiments, in order to reduce the complexity of the model, the input videos may be downsampled. As with image-based tasks such as classification, segmentation, etc., intermediate features can be derived from the image itself such various stages of 2D filters and downsamplers using the neural network model. Since video is 3D, 3D filters and downsamplers may be used in hidden layers of the model.

In some embodiments, the analyzed motion is local in space and time. As such, the filters and downsamplers of the model need not be extensive in space or time. This can substantially reduce the size of the network, from trillions of weights down to perhaps 100 M's of weights, a much of manageable size, and already in use today in state-of-the-art neural networks.

In some embodiments, recognizing that the motion to be assessed may be local in space or time, the neural network may be simplified by being configured to receive only a subset of frames of each video. For example, Equation (16) corresponds to a neural network configured to receive corresponding pairs of adjacent frames of the original and processed videos, while Equation (17) corresponds to a neural network configured to receive corresponding subsets of frames of the original and processed videos, in accordance with some embodiments.

$$D=NN(\{F_k, F_{k-1}, G_k, G_{k-1}\}). \tag{16}$$

$$D=NN(\{F_k, \ldots, F_{k-l}, G_k, \ldots, G_{k-m}\}), \text{ for some integers } l, m > 0. \tag{17}$$

In addition, although Equations (16) and (17) indicate the neural network as receiving as input frames of the unprocessed and processed videos, it is understood that in some embodiments, the neural network may receive corresponding blocks of different frames of the processed and unprocessed videos, or other subsets of frames of the analyzed videos.

In some embodiments, deep learning techniques can be used to derive a set of measures. For example, a CNN or a GAN may be used to derive a set of measures to be used for computing a VQA. In some embodiments, with extensive training data available, a Neural Architecture Search (NAS) method can be used to develop a neural model of a measure.

As such, distortion can, in some embodiments, be characterized as a function of several measures (e.g., as in Equation (12)), where each measure may be preselected (e.g., hand-crafted), or derived using deep learning. In other embodiments, distortion is determined using deep learning (e.g., using neutral network) by receiving as inputs a plurality of measures, and wherein one or more of the measures are determined using a neural network that receives at least a subset of frames of the processed and unprocessed videos, as shown in Equation (18).

$$D=NN(\text{measures}), \text{ and Measure}\_i=NN(\{F_k, \ldots, F_{k-l}, G_k, \ldots, G_{k-m}\}) \tag{18}$$

The neural network may be based on several measures, each of which could be DL-derived, based on local video data (in space and time). In some embodiments, the same type of models may be constructed to apply for VQAs rather than distortion D, and even mixed models (e.g., a VQA based upon one or more distortion measures). The NN formulation, using known effective spatial and temporal measures, can be quite workable, given a reasonably modest number of elementary measures and sufficient training data of human scored videos to determine the parameters (e.g., weights, biases) a posited neural network model. In addition, with the availability of a vast collection of such training data, the neural architecture search (NAS) method can be to derive the model itself, as well as its parameters.

In some embodiments, multiple VQAs of various complexities can be utilized, where complex VQAs (e.g., deep learning VQAs) are used judiciously at the endstage. For example, when using RDO to do motion estimation, the encoder may first reduce the motion search to the top few candidates with simpler VQAs (e.g., PSNR), and then select the best candidate with a more advanced or complex VQA (e.g., DL-fused spatio-temporal error).

FIG. 4 illustrates graphs showing performances of different VQAs, in accordance with some embodiments. Each of the illustrates VQAs in FIG. 4 were derived using a common first set of videos for training (e.g., unprocessed and corresponding processed videos) a simple functional model, and the illustrated results correspond to the trained VQAs applied on a second set of videos for evaluation. In the graphs illustrated in FIG. 4, predicted score indicates an VQA value determined for a particular evaluated video (e.g., indicating a quality of a processed video relative to the original unprocessed video), while true score indicates actual human ratings of the processed video relative to the original unprocessed video (e.g., an MOS of a plurality of human ratings).

The first graph 405 corresponds to predicted scores using an existing VMAF VQA (described above) that is based upon a motion of M of the original video, but does not include any metrics relating to motion of the processed video. The second graph 410 and third graph 415 correspond to predicted scores using respective Fast VDO Video Multi-Algorithm Metrics (FV-VMAF), referred to in FIG. 4 as FVMAF1 and FVMAF2, that correspond to functions combining a plurality of spatial and temporal measures (e.g., similar to Equation (12) above). The measures used in this example consist of VIF, DLM, motion M, and differential motion DM (e.g., determined based upon Equation (1) above). This may result in seven input parameters $x\_i$ (i.e., 4 input parameters for VIF, and one for each of DLM, M, and DM). It has been observed through testing that the measure M is not useful when DM is also used. As such, in some embodiments, six input parameters instead of seven are used.

Second graph 410 corresponds to the measures combined using a linear model, while third graph 415 corresponds to the measures combined using a non-linear model. The table 420 illustrates statistical results of the evaluations performed using each VQA type in graphs 405, 410, and 415. As shown in the table 420, by taking into account differential motion between the unprocessed and processed videos (linearly or nonlinearly), the predicted scores may more closely align with the true human-rated scores. In addition, training a model to determine a nonlinear function may yield improved results over using a linear function.

FIG. 4 thus shows strong results can achieved for applying even a very simple functional model in the training phase, computable as a look-up table, in the VMAF construction. This very elementary model, which remains highly computable is demonstrated to be able to achieve good results. As such, this type of model may be used instead of a full DL-model in applications where complexity is a concern.

Figure 5:
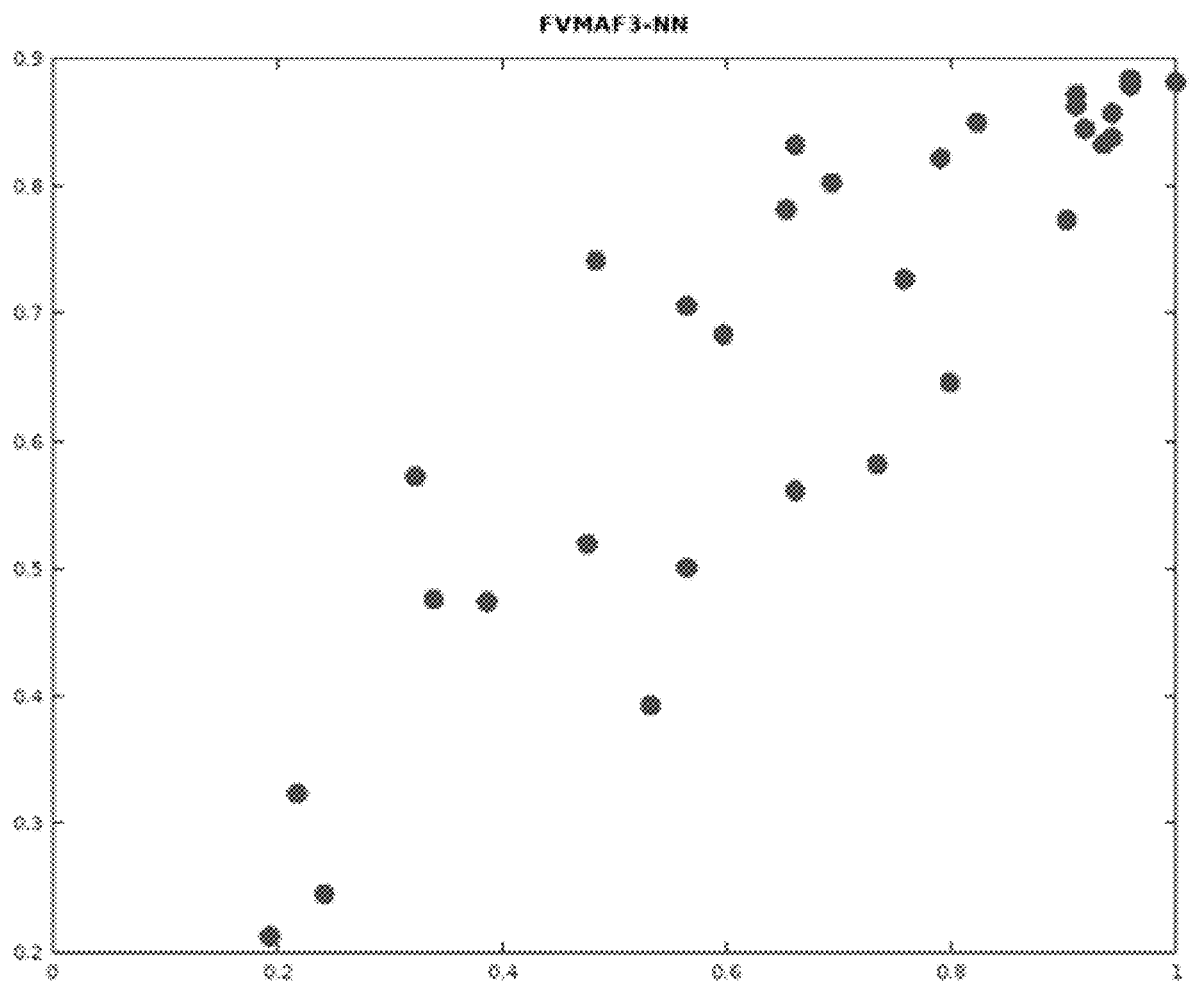
FIG. 5 illustrates a graph showing performance of another FVMAF VQA, in accordance with some embodiments.

FIG. 5 illustrates a graph showing performance of another FVMAF VQA, in accordance with some embodiments. The FVMAF VQA (referred to as FVMAF3) illustrated in graph 505 is trained using a 1-3-1 neural network model (i.e., a neural network model with a single hidden layer of 3 nodes) that takes into account spatial and temporal features. For example, the neural network model may take as inputs the six parameters $x\_i$ described above. Even using a limited data set (e.g., 38 videos for training, and 32 videos for testing/evaluation), results of SRCC=0.910, PCC=0.886, and RMSE=11.521 were able to be achieved, indicating performance similar to VMAF.

In some embodiments, a general nonlinear neural model (e.g., D=NN(measures), see Equation (18) above), which generalizes the SVM model. In general, for neural network models to succeed, a large volume of training data may be needed. To model the distortion function due to video coding and scaling errors, a training set of subjectively rated video content may be used. In some embodiments, for both VMAF and FVMAF, measures based on VIF, DLM, and a motion measure ("M" in VMAF, "DM" in FVMAF) may be used. In some embodiments, VIF itself operates at 4 scales of a wavelet transform, and computes 4 measures, DLM one, and DM one, with a total of 6 inputs.

Figure 6:
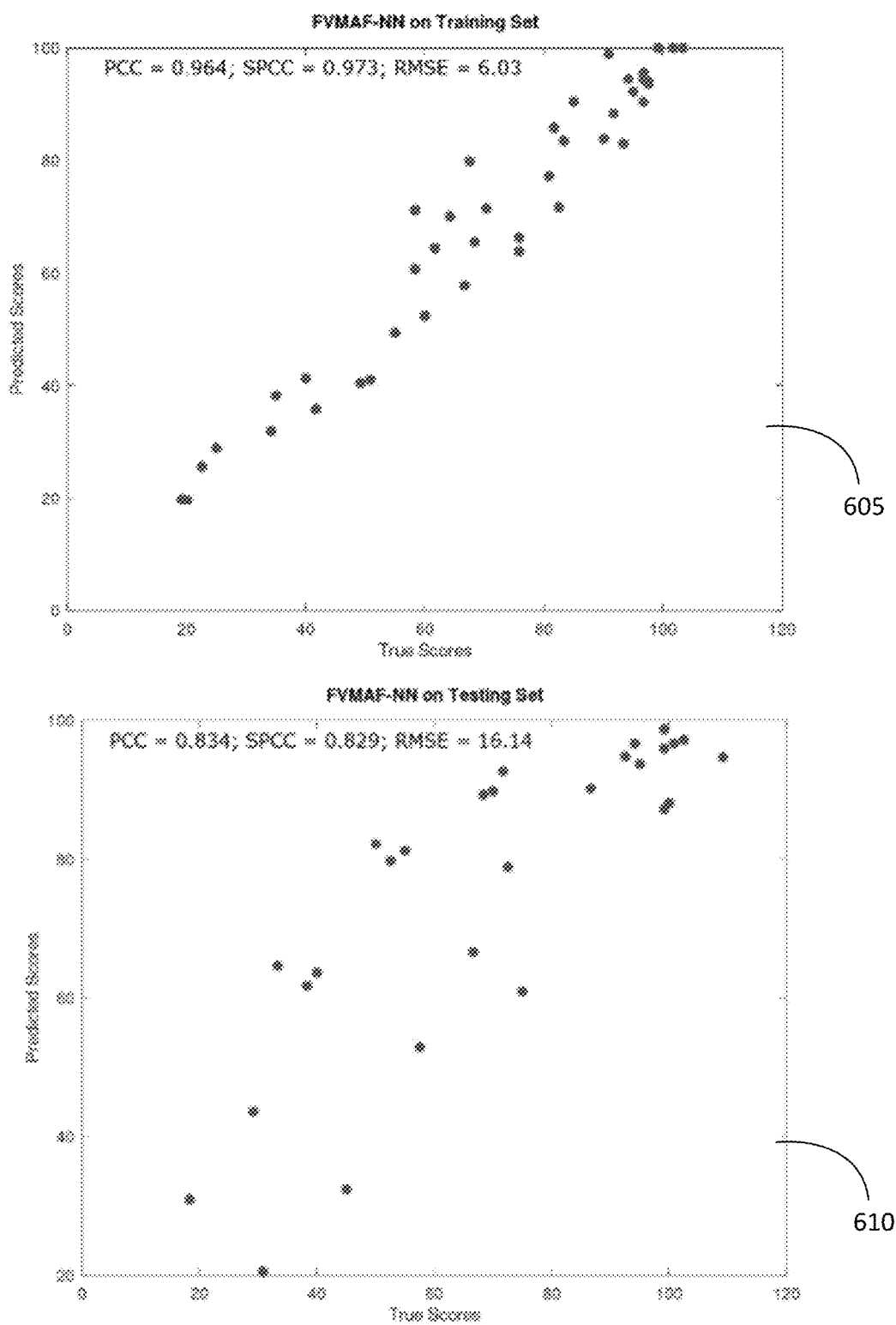
FIG. 6 illustrates graphs showing performance of a FVMAF determined using a simple neural network, in accordance with some embodiments.

FIG. 6 illustrates graphs showing performance of a FVMAF determined using a simple neural network, in accordance with some embodiments. In an embodiment illustrated in FIG. 6, a small, 6-3-1 neural model was used, with a ReLU in the first stage, Softmax in the last stage. Using a training set of 42 video clips and a testing/evaluation set of 28 video clips, about 0.83 correlation on the test data was able to be achieved. Graph 605 illustrates the predicted scores produced by the neural network versus true scores when evaluating clips of the training set, while graph 610 illustrates predicted scores versus true scores when evaluating clips of the testing set.

With the use of larger, non-linear models, the performance of the determined VQAs can be improved. FIG. 7 illustrates graphs showing performance of a FVMAF determined using larger neural networks, in accordance with some embodiments. For example, table 705 illustrates statistic results achieved using a 4-layer nonlinear deep network model having a 6-64-64-1 densely connected structure (FVMAF4), with ReLU function in the first two stages, and Softmax in the final stage (rows 710), while row 715 illustrates performance using a 6-80-64-1 network (FVMAF5). The illustrated results show that very high levels of correlation scores in PCC and SRCC can be achieved using these neural networks.

Table 720 of FIG. 7 shows results achieved using a plurality of different VQAs, including the FVMAFs described above on first and second datasets of videos provided by Netflix, which are able to achieve PCC and SRCC performance of about 97%. The different varieties of FVMAF include FVMAF1 through FVMAF5 as described above.

As such, in some embodiments, VQAs can be constructed using existing spatial measures in combination with differential motion (DM) to achieve improved results. In addition, brand new features using DL techniques, to reach a fully deep learning-based video quality assessment tool. With additional deep neural models and additional data (e.g., training and testing data), these results may be further improved.

Application to Encoder Design

In some embodiments, while real-time VQA performed post-decoding may only need to be computable at 30-60 times/sec, a real-time VQA performed by the encoder may need to be computable~1 M times/sec. As such, due to their complexity, certain models (e.g., complex neural network models) may not be suitable for insertion directly into an encoder at this time.

In some embodiments, a simple function of adding differential motion measures to existing SAD measures may be used to improve quality of a VQA. For example, a simple VQA may be defined as a linear combination of SAD+DM1 (where DM1 means our DM measure in L1 norm, like SAD), with linear coefficients trained by an SVM.

FIG. 8 illustrates a table showing test results using a VQA based upon SAD and DM1, in accordance with some embodiments. In the table 805, SAD and DM are both loss functions, whereas PSNR is a VQA. As the training data is human-scored data (indicating quality), the PCC and SRCC measures will correlate VQAs. Since SAD and DM1 are actually loss functions, they correlate with negative coefficients to generate a VQA. As illustrated, the elementary linear combination of SAD+DM1 may give results better than PSNR.

Furthermore, the results of the SVM used to determine the coefficients is shown in table 810 of FIG. 8, and indicate that in the combined SAD+DM1, the DM1 term dominates, having larger coefficient in comparison to SAD. This indicates that, according to the SVM, the differential motion is much more indicative of human ratings in comparison to the SAD. As such, it is found that the differential motion measure is able to contribute to improvements in encoder rate-distortion optimization. In addition, computation of DM1 also does not add significant complexity to the encoder, as computation of DM1 is similar to SAD in terms of complexity (e.g., see Equation (1) above). FIG. 8 further illustrates testing with L2 variants, MSE and DM2. However, in these limited tests, DM1 alone may correlates best with human ratings.

Table 815 illustrates results of testing individual features on a dataset. In some embodiments, in order to obtain a higher correlation, a spatial measure (e.g., VIF and/or DLM)

and a temporal measure may be used. In some embodiments, due to complexity constraints, a number of spatial measures used may be reduced (e.g., DLM, while powerful, may be too computationally complex to use in an encoder). In some embodiments, DM1 may be the best computable feature. By combining different spatial measures with temporal measures (e.g., DM1) to generate fused metrics, better performing and more consistent results may be achieved.

Application to HDR Video Quality Analysis

Fused VQA measures for standard dynamic range (SDR) videos as described above may further be applied to other applications such as HDR and 360 videos. HDR video is video characterized by both high dynamic range (typically 1K cd/m^2 or higher), significantly beyond that of SDR video (which is typically 100 cd/m^2), and wide color gamut (typically BT.2020), with a color volume significantly beyond the standard BT.709. This type of video provides noticeable value in high end consumer applications such as home theater, but also presents unique challenges in video compression. In some embodiments, wPSNR (or wMSE) metric may be included among the measures to fuse, which is currently used in HDR codec video evaluation, as well as in encoder optimization. This metric weighs errors in samples according to brightness, where brighter samples are weighed more (more noticeable). Equation (19) below illustrates how wPSNR and wMSE may be computed, in accordance with some embodiments.

$$wPSNR = 10 * \log \frac{X^2}{wMSE},$$

$$wMSE = \sum_{\text{all pixels } i \text{ in block}} w_i(luma(x_{orig,i})) * (x_{orig,i} - x_{dec,i})^2 \quad (19)$$

where X is the maximum pixel value for the specific bit depth. The weight, based on luma, may be computed based on Equation (20) below:

$$y_i = 0.015 * luma(x_{orig,i}) - 1.5 - 6; y_i = y_i < -3 ? -3 : (y_i > 6 ? 6 :$$
$$y_i); w_i(luma(x_{orig,i})) = pow(2.0, y_i \div 3.0) \quad (20)$$

In some embodiments, workable measures for SDR videos may be leveraged for evaluating HDR video. In some embodiments, a framework in which HDR is coded by first converting HDR to SDR by a scaling function (a function of spatial location and time) is used. Examples of HDR to SDR conversion are described in "HDR Compression in the JVET Codec," San Diego, August, 2018, the entirety of which is hereby incorporated by reference. In some embodiments, a monochrome scaling function $\lambda = \lambda(x,y,t)$—visualizable as a grayscale video—is used that captures the surplus information in an HDR video over SDR. Then, standard distortion and/or VQA measures of this scaling function can be used in the fused metric, combined with previous SDR-based measures that include spatial and temporal measures. An example of measures for the scaling function is shown in Equation (21) below.

$$RGB\_HDR = \lambda(x,y,t) * RGB\_SDR \cdot E\_hdr = \|\lambda(x,y,t)\|,$$
where $\|*\|$ is an $Lp$ measure,$p \geq 1$, or Entropy. (21)

Application to 360 Video Quality Analysis

Similarly, 360 video is video that ideally lives on a 2D-sphere. However, in reality, sensors and displays are rectangular, so projection formats play a central role. In some embodiments, a commonly used projection is the equi-rectangular projection (ERP). For 360 video, the WS-PSNR (or WMSE) for 360 video can be included among the measures to fuse, which is currently used in the assessment of 360 video in the VVC codec development effort. In brief, the WS-PSNR differs from the ordinary PSNR in that it accounts for the sampling difference between a flat (rectangular) representation and a true spherical one. Since in the ERP domain, the sampling density diverges towards the poles, it is suitably weighted by a cosine, given by Equations (22) and (23).

$$WS\_PSNR = 10 \log \left( \frac{MAX_I^2}{WMSE} \right), w(i,j)_{ERP} = \cos \frac{(j + 0.5 - N/2)\pi}{N} \quad (22)$$

$$WMSE = \frac{1}{\sum_{i=0}^{M-1} \sum_{j=0}^{N-1} w(i,j)} \sum_{i=0}^{M-1} \sum_{j=0}^{N-1} (y(i,j) - y'(i,j))^2 * w(i,j) \quad (23)$$

Process Flow

Figure 9:
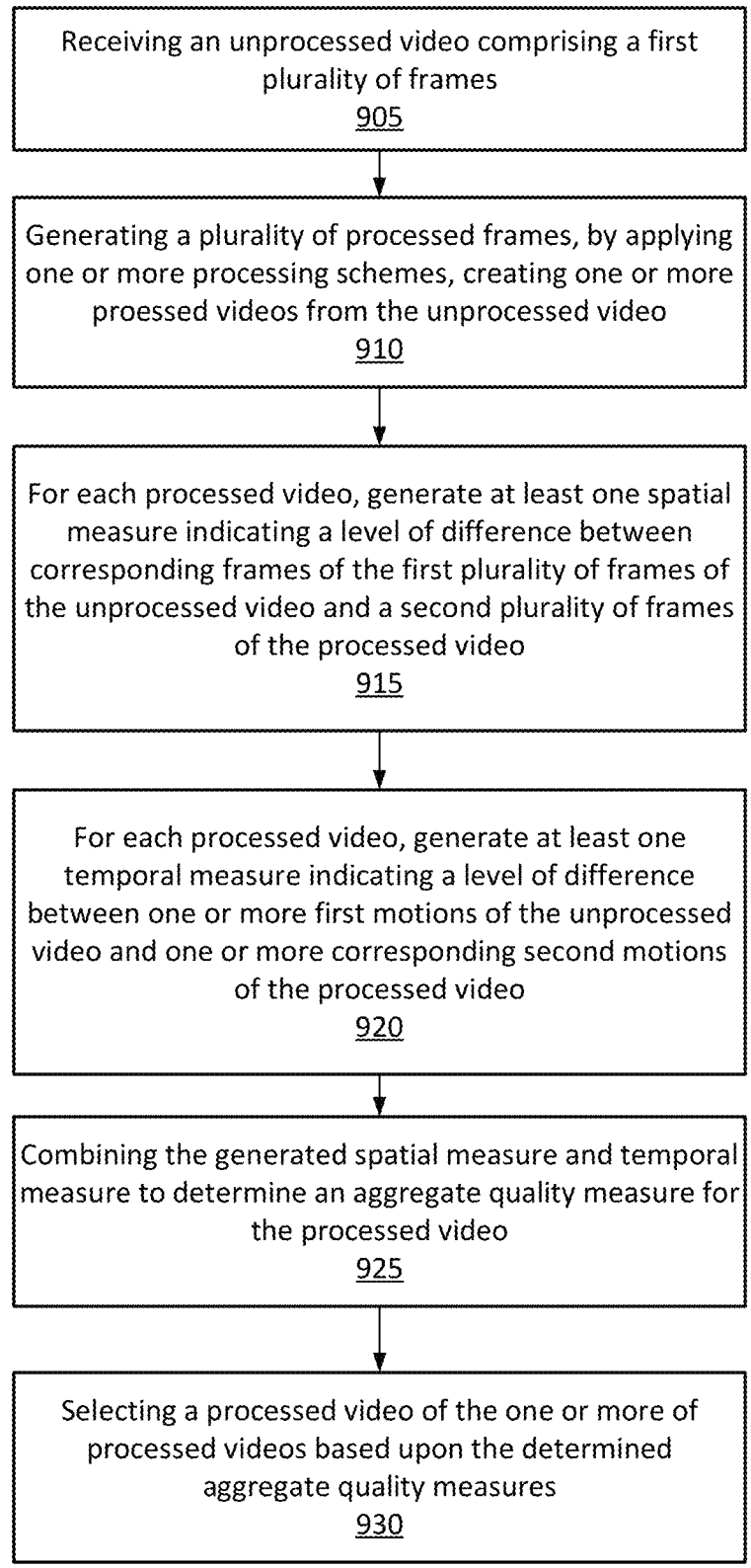
FIG. 9 is a flowchart of a process for selecting a processed video based upon an aggregate or fused VQA, in accordance with some embodiments.

FIG. 9 is a flowchart of a process for selecting a processed video based upon an aggregate or fused VQA, in accordance with some embodiments. In some embodiments, the process may be performed by a server having an encoder to select an encoded video for storage or transmission, or to configure an encoding.

The server receives 905 a source video comprising a first plurality of frames, and generates 910 a plurality of processed videos from the source video using a plurality of encoding schemes, each processed video generated by applying a respective encoding scheme of the plurality of encoding schemes to the source video. In some embodiments, the source video may be an unprocessed video. In some embodiments, the source video may correspond to a video that has undergone previous processing, but is subject to additional processing to produce the processed videos.

To be able to select a processed video, the server generates, for each of the plurality of processed videos, an aggregate quality or loss measure indicating a level of quality of the processed video relative to the source video (e.g., a level of fidelity relative to the source video or a level of loss relative to the source video). In some embodiments, the server decodes or restores the processed video to create a reconstructed video. For example, a video encoder of the server, as it encodes each frame, may also decode and reconstruct the encoded frames, for use in predicting subsequent frames for encoding. As used herein, a processed video may refer to either a processed video or a reconstructed video decoded or reconstructed from a processed video.

The server may further identify, for each processed video, a second plurality of frames of the processed video corresponding to the first plurality of frames of the source video. The server generates 915 at least one spatial measure indicating a level of difference between each of at least a portion of the first plurality of frames and respective corresponding frames of the second plurality of frames. The at least spatial measure may correspond to a quality measure or a loss measure. For example, the at least one spatial measure may comprise an SAD or MSE measure, a VIF measure, a DLM measure, and/or the like, or some combination thereof.

The server also analyzes motion within the source video and each of the processed videos. In some embodiments, the server determines one or more first motions associated with the source video, each first motion based upon one or more frames of the first plurality of frames, and one or more second motions associated with the processed video, each second motion corresponding to a first motion of the one or more first motions, and based upon one or more corresponding frames of the second plurality of frames. In some embodiments, each motion may be based upon a difference between one or more pairs of adjacent frames of a video. The server can thus generate 920 at least one temporal measure indicating a level of difference between the one or more first motions associated with the source video and the one or more second motions associated with the processed. The at least one temporal measure may be a quality measure or a loss measure. For example, in some embodiments, the at least one temporal measure may correspond to a differential motion. In some embodiments, the temporal measure is based upon a level of difference between the first motions and second motions, determined as a sum of absolute differences between a first frame difference corresponding to the first motions and a second frame difference corresponding to the second motions, or a sum of absolute squared differences between the first frame difference and the second frame difference.

The server combines 925 the generated at least one spatial measure and at least one temporal measure to determine the aggregate quality or loss measure for the processed video. In some embodiments, the at least one spatial measure and at least one temporal measure may be combined using a function (a linear function, nonlinear function, or combination thereof). The function may have weights or coefficients determined using an SVL or neural network. In some embodiments, the at least one spatial measure and at least one temporal measure are combined using deep learning (e.g., a deep neural network trained on a training set of qualitative quality measures each indicating a human perceived level of quality of a processed video relative to a corresponding source video).

The steps 915 through 925 described above may be performed on each of the processed videos, in order to generate an aggregate quality measure for each processed video. The server may select 930 a processed video of the plurality of processed videos, based upon the aggregate quality or loss measures determined for each of the processed videos. The server may perform one or more of transmitting the selected processed video or storing the selected processed video on a storage device.

While the above process is described with relation to a server/encoder, it is understood that in some embodiments, the process may be performed by a receiver to select a reconstruction or decoding scheme for processing received video streams.

Computer Architecture

Figure 10:
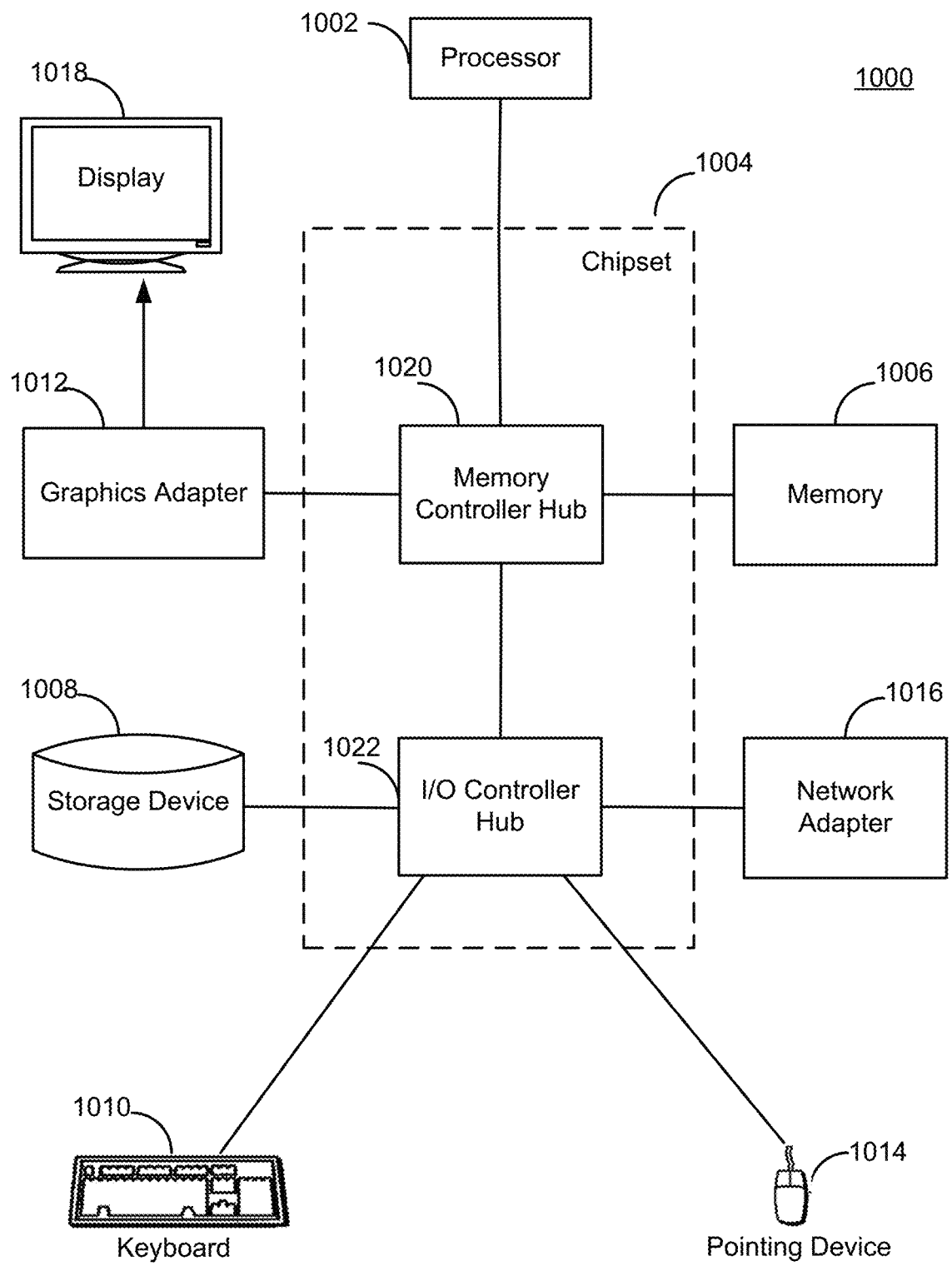
FIG. 10 is a high-level block diagram illustrating an example computer, in accordance with some embodiments.

FIG. 10 is a high-level block diagram illustrating an example computer 1000, such as a computer system 110 shown in FIG. 1. The computer 1000 includes at least one processor 1002 coupled to a chipset 1004. The chipset 1004 includes a memory controller hub 1020 and an input/output (I/O) controller hub 1022. A memory 1006 and a graphics adapter 1012 are coupled to the memory controller hub 2020, and a display 1018 is coupled to the graphics adapter 1012. A storage device 1008, keyboard 1010, pointing device 1014, and network adapter 1016 are coupled to the I/O controller hub 2022. Other embodiments of the computer 1000 have different architectures.

The storage device 1008 is a non-transitory computer-readable storage medium such as a hard drive, compact disk read-only memory (CD-ROM), DVD, or a solid-state memory device. The memory 1006 holds instructions and data used by the processor 202. The pointing device 1014 is a mouse, track ball, or other type of pointing device, and is used in combination with the keyboard 1010 to input data into the computer system 1000. The graphics adapter 1012 displays images and other information on the display 1018. The network adapter 1016 couples the computer system 1000 to one or more computer networks.

The computer 1000 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 1008, loaded into the memory 1006, and executed by the processor 1002.

The types of computers 1000 used as the computer systems 110 of FIG. 1 can vary depending upon the embodiment and requirements. For example, the computer system 110A used for encoding might include one or more blade computers lacking displays, keyboards, and/or other devices shown in FIG. 2. Likewise, the computer system 110B used for decoding might comprise a mobile phone or other such device with a touch-sensitive display and limited processing power.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for determining an objective video quality measure of a test processed video created by processing a test source video that predicts a subjective human quality rating, comprising:

receiving, by a video processing server comprising one or more processors and memory, a set of training processed videos each created from a source video of a set of training source videos, and each associated with a respective human quality rating indicating a level of quality of the training processed video relative to its corresponding training source video;

generating a feature vector for each of the plurality of training processed videos by analyzing pairs of training processed videos and their corresponding training source videos, said feature vector serving as a basis of determining by a neural network an output numerical score to correlate with the human quality ratings of the training processed videos, by, for a training processed video and corresponding training source video pair:

identifying a first plurality of frames of the training source video and a second plurality of frames of the training processed video corresponding to the first plurality of frames of the training source video;

generating a plurality of frame-level spatial measures indicating a level of fidelity between each of at least a portion of the first plurality of frames and respective corresponding frames of the second plurality of frames;

determining one or more first motions associated with the training source video, each first motion based upon analyzing at least a portion of two or more frames of the first plurality of frames;

determining one or more second motions associated with the training processed video, each second motion based upon analyzing at least a portion of two or more frames of the second plurality of frames that correspond to the two or more frames of a respective first motion of the one or more first motions;

generating at least one frame-level temporal measure indicating a level of fidelity between the one or more first motions associated with the training source video and the one or more second motions associated with the training processed video; and combining the generated plurality of frame-level spatial measures and at least one frame-level temporal measure into global features for the training processed video and training source video, to form the feature vector of the training processed video; and training a neural network to generate an aggregate quality measure for the processed videos based upon the feature vector comprised of the plurality of spatial measures and at least one temporal measure, by:

formulating the neural network architecture, including an input number of nodes equal to a number of spatial and temporal features utilized of the generated feature vectors, a candidate set of hidden layers, connections, activation functions, a training loss function, a training optimization method, and one output node;

training the neural network by iteratively inputting to the neural network the feature vectors of the set of training processed videos, generating aggregate quality measures based upon the feature vector composed of the plurality of spatial measures and at least one temporal measure, comparing the aggregate quality measures to the human rated scores associated with the set of training processed videos using the training loss function, and applying the training optimization method to minimize incrementally the training loss function;

terminating the training of the neural network based upon a reaching a termination point corresponding to a threshold level of correlation between the human rated scores and the generated aggregate quality measures according to a combination of Pearson and Spearman Rank Correlation Coefficients, a predetermined number of iterations, or a predetermined period of training time;

switching from the training phase to the testing phase of the neural network processing;

generating an aggregate quality measure for a test processed video separate from the set of training processed videos of the training set, the test processed video created from a test source video separate from the set of training source videos of the training set, by:

determining a feature vector of the test processed video, by determining the plurality of spatial measures and at least one temporal measure for the test processed video and the test source video; and processing the feature vector forward through the trained neural network to obtain an aggregate quality measure of the test processed video.

2. The method of claim 1, wherein a first motion of the one or more first motions indicates a first frame difference between at least two frames of the first plurality of frames, and a second motion of the one or more second motions indicates a second frame difference between corresponding at least two frames of the second plurality of frames.

3. The method of claim 2, wherein the frame-level spatial and temporal features are computed at the frame, slice, tile, or block level within a prediction loop of an encoder.

4. The method of claim 2, wherein a level of difference between the one or more first motions and the one or more second motions is a sum of absolute differences between the first frame difference and the second frame difference, or a sum of absolute squared differences between the first frame difference and the second frame difference.

5. The method of claim 1, wherein the source video corresponds to an encoded video, wherein the processed video corresponds to further processing of the encoded video after decoding to a reconstructed processed video, and wherein the subjective human quality rating and the objective neural-network generated quality score are associated with the encoded source video.

6. The method of claim 1, wherein the source video corresponds to an unencoded video, and wherein the processed video is generated based upon an encoding of the source video, which is decoded to a reconstructed processed video prior to extracting spatial and temporal features.

7. A method for optimizing an encoder for encoding video, comprising:
receiving an unencoded video;
encoding the unencoded video at an encoder using a first encoding scheme to generate an encoded video, wherein one or more parameters of the first encoding scheme are selected based upon a distortion measure indicating a level of distortion of the encoded video relative to the unencoded video, at the frame or block level within an encoder prediction loop;
wherein the distortion measure corresponds to a combination of one or more spatial measures indicating a level of difference between a plurality of corresponding frames of the encoded video and the unencoded video, and one or more temporal measures indicating a level of difference between a first motion corresponding to a first frame difference between a plurality of frames of the unencoded video and a second motion corresponding to second frame difference between a corresponding plurality of frames of the encoded video, wherein the spatial and temporal measures are computed at the frame or block level within the encoder prediction loop; and
wherein the spatial measures and the temporal measures are combined using a machine learning method to determine a distortion measure used in selecting encoding parameters at the frame or block level within the encoder prediction loop.

8. The method of claim 7, wherein the machine learning method is a support vector machine, which determines coefficients for a linear combination of the one or more spatial and the one or more temporal measures.

9. The method of claim 7, wherein the machine learning method is a trained neural network, which determines a nonlinear functional combination of the one or more spatial and the one or more temporal measures.

10. A computer-implemented method for restoring a processed video, comprising:
receiving, by a video processing computer comprising one or more processors and memory, a source video comprising a first plurality of frames;
generating a plurality of restored videos from the source video using a plurality of restoration schemes, each restored video generated by:
decoding as appropriate the processed video to create a reconstructed video;
and applying a respective restoration scheme of the plurality of restoration schemes to the reconstructed video;
generating, for each of the plurality of restored videos, an aggregate quality measure indicating a level of quality or loss of the restored video relative to the source video, by:
identifying a second plurality of frames of the restored video corresponding to the first plurality of frames of the source video;
generating at least one spatial quality measure indicating a level of difference between each of at least a portion of the first plurality of frames and respective corresponding frames of the second plurality of frames;
determining one or more first motions associated with the source video, each first motion based upon analyzing two or more frames of the first plurality of frames;
determining one or more second motions associated with the processed and reconstructed video, each second motion based upon analyzing two or more corresponding frames of the second plurality of frames that correspond to the two or more frames of a respective first motion of the one or more first motions;
generating at least one temporal quality measure indicating a level of difference between the one or more first motions associated with the source video and the one or more second motions associated with the restored video; and
combining the generated at least one spatial quality measure and at least one temporal quality measure by a machine learning method to determine the aggregate quality measure for the restored video; and
selecting a restored video of the plurality of restored videos, based upon the aggregate quality measures determined for each of the restored videos;
performing one or more of displaying the selected restored video or storing the selected restored video on a storage device.

11. The method of claim 10, wherein a first motion of the one or more first motions indicates a first frame difference between at least two frames of the first plurality of frames, and a second motion of the one of more motions indicates a second frame difference between corresponding at least two frames of the second plurality of frames.

12. The method of claim 10, wherein combining the generated at least one spatial measure and at least one temporal measure comprises inputting the at least one spatial measure and at least one temporal measure into a trained neural network model configured to determine a function for combining the at least one spatial measure and at least one temporal measure to generate an aggregate quality or loss measure, wherein the neural network model is trained based upon a training set of quality measures indicating a level of human-perceived quality of processed videos relative to corresponding source videos.

13. A computer-implemented method for selecting a processed video among a plurality of processed videos, configured to select a processed video based on optimizing for subjective visual quality among the processed videos, comprising:
receiving, by a video processing server comprising one or more processors and memory, a trained neural network for determining an objective video quality measure, a source video comprising a first plurality of frames, as well as a plurality of associated processed videos each created from the source video by a processing method;
generating, for each of the plurality of processed videos, an objective video quality measure by applying the trained neural network by the method of claim 1, by analyzing the processed and associated source videos;
selecting a processed video of the plurality of processed videos, based upon using the video quality measure of each processed video as a basis for the selection.

14. The method of claim 1, wherein the plurality of spatial measures includes one or more of a Detail Loss Metric, Visual Information Fidelity at various levels, SSIM, SAD, MSE, and spatial generalized gaussian distribution parameters.

15. The method of claim 1, wherein the at least one temporal measure includes a Differential Motion measure or a temporal generalized gaussian distribution parameter.

16. The method of claim 1, wherein the training the first neural network or neural network further comprises adding an output score from the neural network as another feature in the input of a next feedforward neural network model for training.

17. The method of claim 1 of determining the objective quality of a test processed video, which predicts a subjective human quality rating, treating both a full reference and a no reference case, comprising:
   in the full reference case, applying the method of claim 1 to the pairs of training source and training processed videos; and
   in the no reference case, applying the method of claim 1 wherein the training source videos are processed videos and the training processed videos are further-processed videos created by applying a filter to respective training source videos.

18. The method of claim 7, wherein each of the processing schemes is a method of encoding a video according to a video codec selected from standardized video codecs produced by the International Telecommunications Union, the International Standards Organization, or the Alliance for Open Media (AOM), together with a set of encoding parameters including at least three of: frame size, frame rate, bit rate or nominal quantization parameter, frame partitions, predictors, filters, transforms, mode decisions, quantization offset parameters, and entropy coder parameters.

19. The method of claim 7, wherein the selected processed video is stored in a storage device, or transmitted on a communications channel.

\* \* \* \* \*